US011602999B1

(12) United States Patent
Flatland

(10) Patent No.: US 11,602,999 B1
(45) Date of Patent: Mar. 14, 2023

(54) PREDICTIVE CONTROL STRATEGIES FOR VEHICLES

(71) Applicant: Zoox, Inc., Foster City, CA (US)

(72) Inventor: Ryan O'Leary Flatland, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 844 days.

(21) Appl. No.: 15/968,222

(22) Filed: May 1, 2018

(51) Int. Cl.
*G05D 1/02* (2020.01)
*B60L 15/20* (2006.01)

(52) U.S. Cl.
CPC ........ *B60L 15/2045* (2013.01); *G05D 1/0217* (2013.01); *B60L 2240/12* (2013.01); *B60L 2240/16* (2013.01); *B60L 2240/642* (2013.01); *B60L 2260/50* (2013.01); *G05D 2201/0213* (2013.01)

(58) Field of Classification Search
CPC ................................................ B60W 60/0023
See application file for complete search history.

(56) References Cited

U.S. PATENT DOCUMENTS

| | | | |
|---|---|---|---|
| 9,630,494 B1 * | 4/2017 | Glauber | B60K 23/08 |
| 9,662,974 B2 * | 5/2017 | Mao | B60W 30/18 |
| 9,669,820 B1 * | 6/2017 | Conlon | B60K 6/448 |
| 9,995,386 B2 * | 6/2018 | Noguchi | F16H 61/16 |
| 10,203,031 B2 * | 2/2019 | Gauthier | F16H 59/66 |
| 2009/0057047 A1 * | 3/2009 | Beechie | B60K 23/08 |
| | | | 180/233 |
| 2010/0262326 A1 * | 10/2010 | Buszek | B60K 17/35 |
| | | | 701/31.4 |
| 2012/0109414 A1 * | 5/2012 | Kumabe | B60W 50/045 |
| | | | 701/1 |
| 2014/0067216 A1 * | 3/2014 | Stares | B60K 23/08 |
| | | | 701/69 |
| 2015/0014081 A1 * | 1/2015 | Noguchi | B60K 17/356 |
| | | | 180/243 |
| 2015/0291027 A1 * | 10/2015 | Strasser | B60K 23/08 |
| | | | 701/69 |
| 2015/0328982 A1 * | 11/2015 | Takaira | B60W 10/119 |
| | | | 180/233 |
| 2016/0355089 A1 * | 12/2016 | Ogawa | B60K 17/02 |
| 2017/0050536 A1 * | 2/2017 | Martin | B60K 1/02 |
| 2017/0326976 A1 * | 11/2017 | Burt | B60K 17/3515 |
| 2018/0059670 A1 * | 3/2018 | Nilsson | B60W 30/09 |
| 2018/0154899 A1 * | 6/2018 | Tiwari | B60W 60/0011 |
| 2018/0222477 A1 * | 8/2018 | Wang | B60W 50/0097 |
| 2018/0274453 A1 * | 9/2018 | Livshiz | F16H 63/50 |

(Continued)

FOREIGN PATENT DOCUMENTS

DE 19600734 A1 * 7/1997 ........ B60W 30/1819

*Primary Examiner* — Anne Marie Antonucci
*Assistant Examiner* — Amelia Vorce
(74) *Attorney, Agent, or Firm* — Lee & Hayes, P.C.

(57) ABSTRACT

Demand associated with one or more vehicle systems can be predicted for a vehicle traversing a planned travel path. Based at least in part on the predicted demand, a control strategy can be determined for controlling operation of the one or more vehicle systems to optimize for efficiency, cabin temperature, component temperature, passenger comfort, etc. The one or more vehicle systems can be controlled, based at least in part on the control strategy, at least one of before the vehicle traverses the travel path, or as the vehicle traverses the travel path.

10 Claims, 6 Drawing Sheets

(56) References Cited

U.S. PATENT DOCUMENTS

| | | | | |
|---|---|---|---|---|
| 2018/0356819 | A1* | 12/2018 | Mahabadi | B60W 30/09 |
| 2018/0374360 | A1* | 12/2018 | Miao | G05D 1/0246 |
| 2019/0004526 | A1* | 1/2019 | Soliman | B60W 60/001 |
| 2019/0016329 | A1* | 1/2019 | Park | B60K 6/32 |
| 2019/0113927 | A1* | 4/2019 | Englard | G05D 1/0231 |
| 2019/0193750 | A1* | 6/2019 | Kim | B60W 10/10 |
| 2019/0225232 | A1* | 7/2019 | Blau | B60W 50/0098 |
| 2019/0250609 | A1* | 8/2019 | Luo | G05D 1/0088 |
| 2019/0302768 | A1* | 10/2019 | Zhang | B60W 50/14 |
| 2019/0318267 | A1* | 10/2019 | Zhang | G06F 30/20 |
| 2019/0322174 | A1* | 10/2019 | Koebler | B60T 7/18 |
| 2019/0324463 | A1* | 10/2019 | Zhu | B60W 10/10 |

* cited by examiner

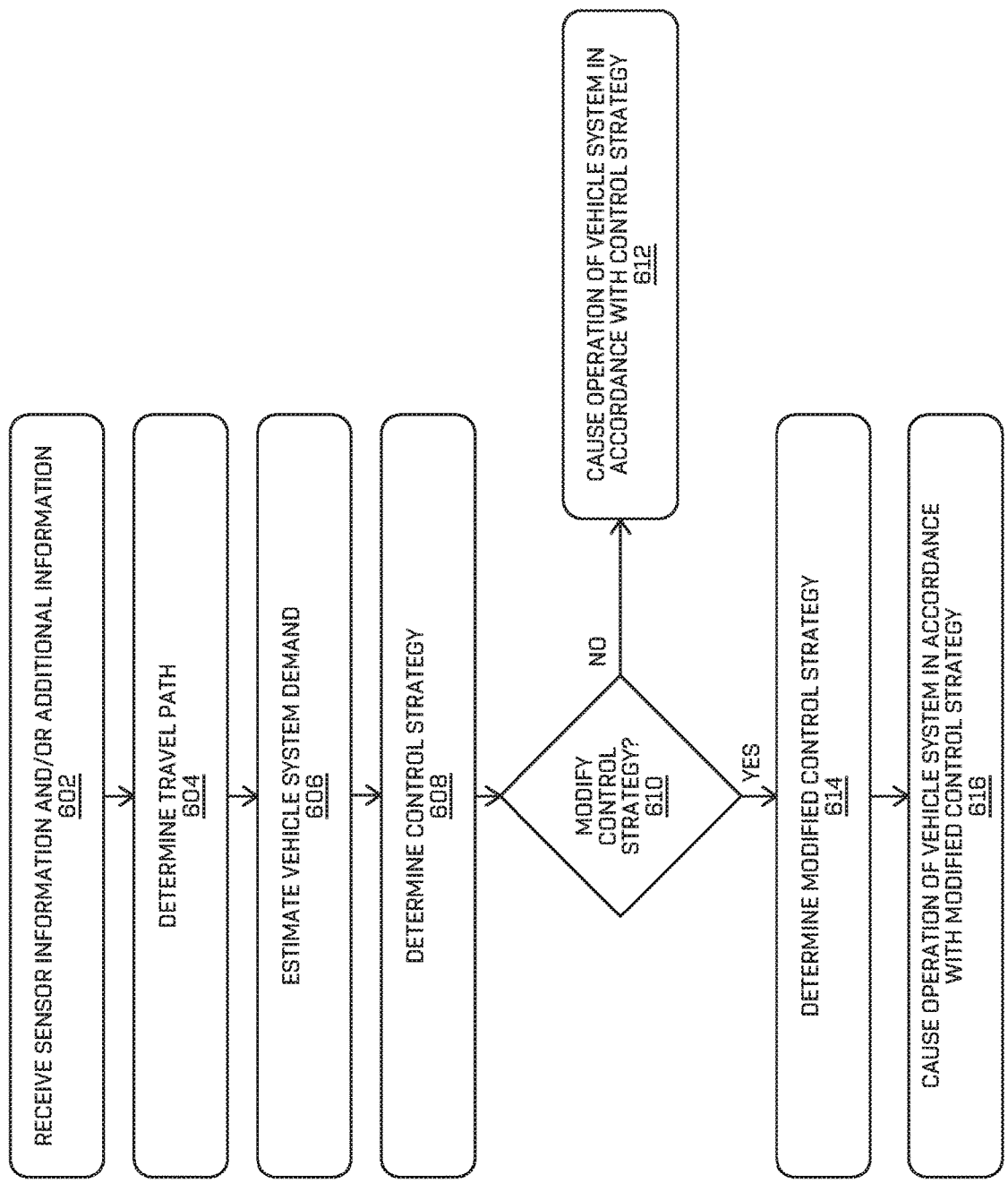

US 11,602,999 B1

PREDICTIVE CONTROL STRATEGIES FOR VEHICLES

BACKGROUND

Vehicles may be used to transport people between different locations. Normal driving procedures may include maneuvering the vehicle within the confines of a lane, maneuvering around turns in the road, safely passing through intersections, as well as complying with traffic laws. Typically, such a vehicle may include a power train, a powertrain cooling system, a cabin cooling system, a suspension system, and/or other systems that can be controlled as the vehicle travels to a destination. In existing vehicles, such systems are operated in accordance with a reactive control strategy in which operation of various system components changes in response to changes in system conditions, demands placed on such systems, road conditions, or other factors. While such a reactive control strategy may be acceptable in some situations, operating vehicle systems based on such a strategy reduces overall vehicle efficiency and results in unnecessary power and/or other resource consumption.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

As shown in FIG. 1, such a vehicle may include a predictive control system. The predictive control system may be configured to control the operation of one or more additional systems of the vehicle based on an estimated (e.g., predicted or projected) demand associated with the vehicle traversing at least a portion of a planned travel path.

FIG. 6 is a flow diagram illustrating an example method for operating an example vehicle traveling in a road network. Such an example method may include determining one or more control strategies governing operation of one or more systems of the vehicle, and causing the one or more systems to operate in accordance with the respective control strategies.

DETAILED DESCRIPTION

Figure 1:
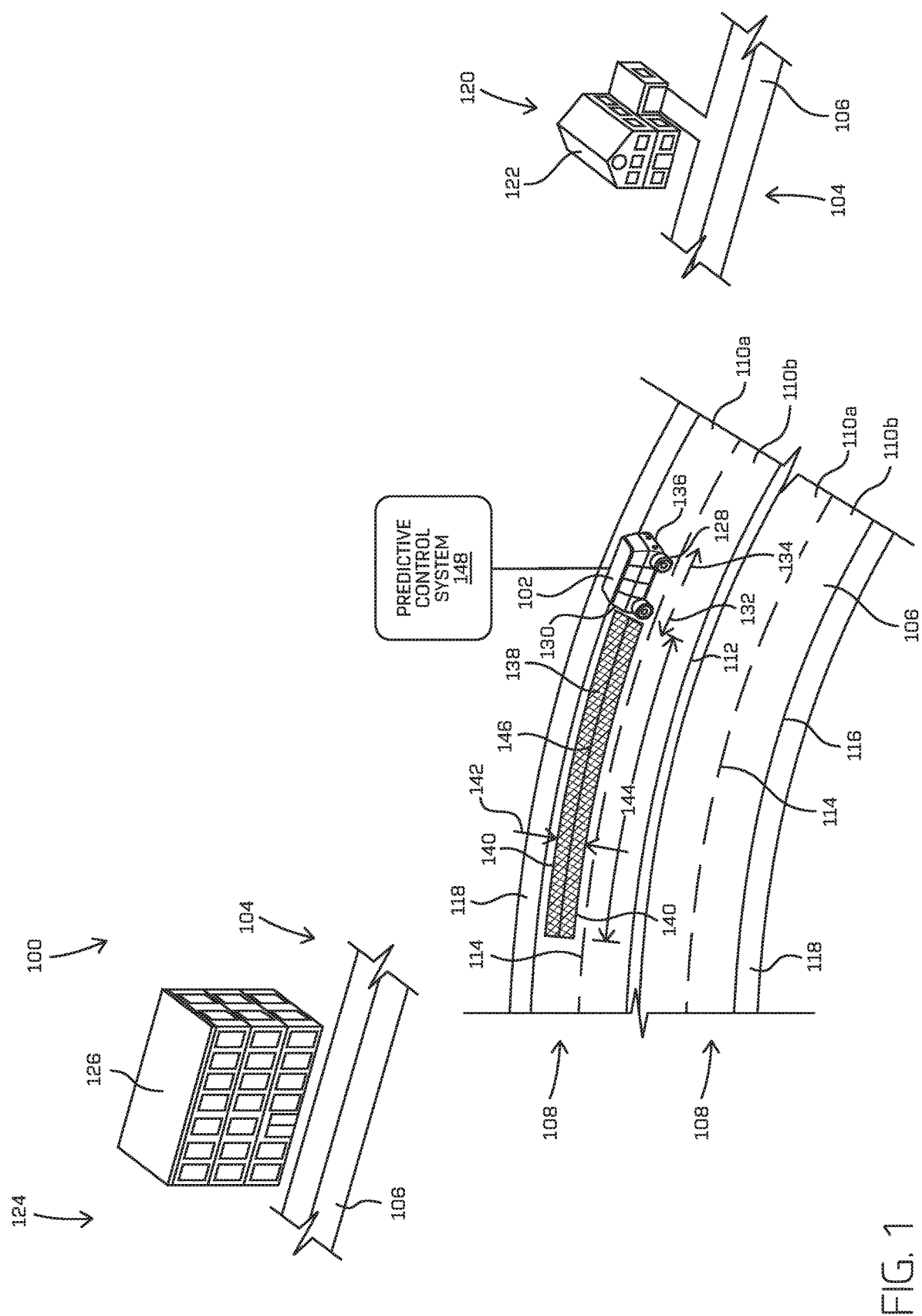
FIG. 1 is a schematic diagram of an example environment through which an example vehicle travels along a road of a road network.

This disclosure is generally directed to optimizing characteristics of subsystems of a vehicle, such as a driverless vehicle, for particular actions by causing one or more systems, or subsystems, of the vehicle to operate based on an estimated (e.g., predicted or projected) load or demand associated with the vehicle traversing a planned travel path. In one such example, optimization may be performed to increase the overall efficiency of the vehicle. For example, a vehicle may include a plurality of different systems including a powertrain, a suspension system, a cabin temperature system, a powertrain cooling system, a braking system, and other systems that may be dynamically controlled as the vehicle travels on a road of a road network based on characteristics of the road (e.g., a road grade), characteristics of a desired trajectory and/or path (e.g., speed, turning radius, etc.), characteristics of an environment (e.g., external temperature), and/or desired characteristics, as will be described in detail herein. Such systems may act in concert to facilitate movement of the vehicle, to provide a comfortable and enjoyable ride experience for one or more passengers of the vehicle, and/or to otherwise facilitate operations of the vehicle during use.

A respective power draw, thermal load, aerodynamic drag, and/or other such load or demand may be associated with the operation of one or more such systems. For example, transitioning from front-wheel drive operation of the vehicle to all-wheel drive operation of the vehicle may result in an increase in torque available for vehicle propulsion. Transitioning from front-wheel drive operation to all-wheel drive operation may include activating, connecting, and/or otherwise engaging a second or additional vehicle drive motor with a vehicle drive axle, and such engagement may result in the increase in available torque noted above. Transitioning from front-wheel drive operation to all-wheel drive operation may also require engaging a clutch, spinning up a corresponding clutch plate, and/or activating one or more additional powertrain components. Such operations may place corresponding power demands on a battery or one or more other resources of the vehicle. In further examples, operating the cabin temperature system to increase a temperature within the cabin may place a thermal load on one or more motors, engines, batteries, and/or other powertrain components or heat sources of the vehicle. In still further examples, operating the powertrain cooling system to reduce a temperature of an engine, a motor, a battery, and/or other component of the powertrain may require manipulating one or more shutters, fins, vanes, louvers, windows, panels, fans, or other powertrain cooling system components exposed to ambient air to increase convective cooling of such powertrain components. Operating the powertrain cooling system in this way may, however, affect (e.g., increase) an aerodynamic drag of the vehicle.

In order to minimize the power draw, thermal load, aerodynamic drag, and/or other loads or demands associated with operating such systems, example vehicles of the present disclosure may be configured to operate such systems in accordance with predictive control strategies tailored to optimize the performance of such vehicle systems. For instance, an example vehicle of the present disclosure may include a predictive control system in communication with one or more components of the powertrain, the suspension system, the cabin temperature system, the powertrain cooling system, the braking system, and/or other such vehicle systems. The predictive control system may be configured to receive information indicative of a trajectory and/or a planned travel path of the vehicle, and to estimate a demand associated with operating one or more of the above vehicle systems as the vehicle traverses at least a portion of the planned travel path. The predictive control system may also be configured to determine a respective control strategy for operating one more of the vehicle systems described herein and based at least in part on the estimated demand associated with the respective vehicle systems.

In some examples, a path planner or other component of a vehicle controller may generate a drive envelope that defines an area within which the vehicle may operate when traversing a planned travel path. The path planner may also generate a planned travel path that is representative of a path or route extending from a current location of the vehicle (e.g., an original location) in the road network to a desired destination location in the road network. The planned travel path may, in some embodiments, extend from the current location of the vehicle to the destination location. In other example embodiments, the planned travel path may extend from the vehicle's current location and may comprise a portion (e.g., a trajectory, etc.) of a route extending from the current location to the destination location. The drive envelope and/or the corresponding planned travel path may extend, in a direction of travel, for a distance that the vehicle may traverse in a fixed period of time (e.g., according to a receding horizon technique). Additionally or alternatively, the drive envelope and/or the corresponding planned travel path may extend for a specified finite distance. In any of the examples described herein, a planned travel path may comprise one or more lines, segments, or routes indicating an ideal trajectory for the vehicle to follow within the drive envelope. For example, such a drive envelope may extend for a portion of a planned travel path along which the vehicle may be controlled to travel for between approximately 6 seconds and approximately 10 seconds, though any time period is contemplated. Alternatively, such a drive envelope may extend a fixed distance, e.g. 500 feet, in the direction of a planned travel path along which the requesting vehicle may be controlled to travel. It is understood that the finite periods of time and finite distances noted above are merely examples and, in further embodiments, such finite periods of time and finite distances may be greater than or less than those noted above.

In such examples, the path planner may provide information indicative of the planned travel path to the predictive control system, and as noted above, the predictive control system may estimate (e.g., predict or project) a demand associated with operating one or more of the above vehicle systems as the vehicle traverses at least a portion of the planned travel path. The predictive control system may also be configured to determine a respective control strategy for operating one more of the vehicle systems described herein and based at least in part on the estimated (e.g., predicted or projected) demand associated with the respective vehicle systems. Further, the predictive control system may be configured to cause one or more of the vehicle systems described herein to operate in accordance with such a respective control strategy. For example, the predictive control system may cause one or more components of the powertrain, the suspension system, the cabin temperature system, the powertrain cooling system, the braking system, and/or other vehicle systems to operate proactively, in accordance with a predictive control strategy, before the vehicle traverses a portion of the planned travel path and/or as the vehicle traverses the planned travel path. As a result, the loads and/or other demands associated with operating the vehicle systems described herein may be minimized, and the overall efficiency of the vehicle may be improved. In addition, operating such vehicle systems in accordance with the predictive control strategies described herein are not limited to vehicle efficiency, but may also result in smoother clutch engagements, improved suspension control, minimized vehicle body roll, improved cabin temperature control, improved vehicle and/or component durability (e.g., due to reduced number of component engagements/disengagements), a reduction in noise vibration harshness, and/or other improvements in passenger comfort. Further, any of the control strategies described herein may be used in order to control the operation of multi-speed transmissions and/or components thereof.

The techniques and systems described herein may be implemented in a number of ways. Example implementations are provided below with reference to the figures.

FIG. 1 is a schematic diagram of an example environment 100 through which an example vehicle 102 travels. The example environment 100 includes a road network 104 including a plurality of example roads 106 having two pairs 108 of lanes 110a, 110b separated by a median or double-yellow line 112. For example, a first lane 110a, a second lane 110b, and/or one or more additional lanes may be at least partially defined by a lane dividing line 114 and/or a lane boundary line 116. The example road 106 also includes shoulders 118 located on opposite sides of the road 106. FIG. 1 also shows an example geographic location 120 associated with a departure location including a structure 122, such as a house or building, and an example destination 124 also including a structure 126, such as a house or building. The road network 104 provides a number of roads 106 extending between the geographic location 120 and the destination 124, and FIG. 1 shows an enlarged view of a portion of an example road 106. The road network 104 may include a number of features, such as curves, inclines, declines, intersections with cross-roads, crosswalks, speed bumps, traffic signs, traffic lights, railroad crossings, bridges, traffic circles, directional arrows, and/or other features.

For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In that case, since the vehicle 102 may be configured to control all functions from start to completion of the trip, including all parking functions, it may not include a driver. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 shown in FIG. 1 includes four wheels 128 and respective tires for each of the wheels 128. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, one or more fuel cells, any combination thereof, and/or any other suitable power sources. In addition, although the example vehicle 102 has four wheels 128, the systems and methods described herein may be incorporated into vehicles having fewer or a greater number of wheels, tires, and/or tracks. The example vehicle 102 has four-wheel steering and may operate generally with equal performance characteristics in all directions, for example, such that a first end 130 of the vehicle 102 is the front end of the vehicle 102 when travelling in a first direction 132, and such that the first end 130 becomes the rear end of the vehicle 102 when traveling in the opposite, second direction 134, as shown in FIG. 1. Similarly, a second end 136 of the vehicle 102 is the front end of the vehicle 102 when travelling in the second direction 134, and such that the second end 136 becomes the rear end of the vehicle 102 when traveling in the opposite, first direction 132. These example characteristics may facilitate greater maneuverability, for example, in small spaces or crowded environments, such as parking lots and urban areas. It is understood that the vehicle 102 may operate in a front-wheel drive mode in which, for example, the two wheels 128 proximate the first end 130 are powered to drive movement of the vehicle 102, in a rear-wheel drive mode in which, for example, the two wheels 128 proximate the second end 136 are powered to drive movement of the vehicle 102, or in all-wheel drive mode in which each of the four wheels 128 is powered to drive movement of the vehicle 102.

In the example shown in FIG. 1, the vehicle 102 may use various sensors and a vehicle controller to autonomously operate through the environment 100 along a planned travel path via the road network 104. For example, a vehicle computing device may be configured to determine a drive envelope 138 defined by virtual boundaries 140 within which the vehicle 102 may travel. An example drive envelope 138 may have a variable envelope width 142 in the width direction of the vehicle 102, and a variable envelope length 144 extending in the direction of travel of the vehicle 102. In some examples, the virtual boundaries 140 of the drive envelope 138 may be determined based at least in part on sensor data received from sensors associated with the vehicle 102 and/or road network data received by the vehicle 102 via a road network data store. Although depicted as a rectangular area in FIG. 1 for illustrative purposes, the drive envelope 138 may not necessarily conform to any particular shape. As a non-limiting example, the drive envelope 138 may be generally rectangular, except for indented areas associated with obstacles along the path (either static or dynamic). In some examples, the vehicle 102 may travel along a planned travel path 146 (sometimes referred to herein as a "travel path") defined by and/or otherwise within the drive envelope 138. In such examples, the planned travel path 146 may extend approximately centrally through the drive envelope 138, and the drive envelope 138 may define at least part of the planned travel path 146 that the vehicle 102 traverses to reach the particular destination 124. In some examples, the planned travel path 146 may be determined by, substantially simultaneously, generating a plurality of trajectories and selecting one of the trajectories which is best able to achieve the planned travel path 146. In such examples, the drive envelope 138 and/or the planned travel path 146 may be calculated in accordance with a receding horizon technique such that the drive envelope 138 and/or the planned travel path 146 only provides commands for a particular time window (e.g. less than 10 seconds) and is recalculated at a certain frequency (e.g. 10 Hz, 30 Hz, etc.).

The vehicle 102 may also include a predictive control system 148, and in some examples, the predictive control system 148 may be operably and/or otherwise connected to the vehicle computing device of the vehicle 102. In such examples, the predictive control system 148 and/or the vehicle computing device may be communicatively and/or otherwise connected to a network. In such examples, the predictive control system 148 and/or the vehicle computing device may be configured to send information to and/or receive information from a remote computing device via the network. In such examples, a signal provided by the vehicle computing device of the vehicle 102 may include sensor information and/or other information indicative of a current location of the vehicle 102. The signal may also include an address, global positioning coordinates, and/or other indication of the desired destination 124, and such information may be provided by a vehicle passenger via the predictive control system 148. The signal may further include an identifier uniquely identifying the requesting vehicle 102, an additional identifier uniquely identifying one or more passengers of the requesting vehicle 102, and/or other information associated with the vehicle 102, the drive envelope 138, the planned travel path 146, the desired destination 124, and/or other aspects of the environment 100.

In some examples, the predictive control system 148 may comprise a hardware component of the vehicle 102 in communication with a local vehicle computing device of the vehicle 102, or alternatively, the predictive control system 148 may comprise a software component operable or executable by the local vehicle computing device of the vehicle 102. Regardless of its configuration, as will be described in greater detail below, the predictive control system 148 may be configured to receive information indicative of the drive envelope 138 and/or the planned travel path 146. For example, a prediction system, planning system, and/or other system associated with the local vehicle computing device may generate and/or otherwise determine at least a portion of the planned travel path 146 based on a current location of the vehicle 102, an address or other information indicating a location of the desired destination 124, road network data, and/or other information. One or more such systems of the vehicle 102 may provide the planned travel path 146 to the predictive control system 148, and the predictive control system 148 may estimate a demand associated with the vehicle 102 based at least in part on the planned travel path 146. For example, in situations in which the planned travel path 146 requires the vehicle 102 to traverse a portion of the road 106 having an inclined grade, the predictive control system 148 may estimate a power or other load that will be required of the power train of the vehicle 102 in order for the vehicle 102 to traverse the determined travel path 146 at a desired speed, within a desired speed range, at a desired acceleration, within a desired acceleration range, with a desired torque, with a desired range of torques, and/or within a desired period of time. Such a power, speed, acceleration, torque, and/or other demands associated with the respective vehicle systems may be estimated (e.g., predicted or projected) by the predictive control system 148 using one or more look-up tables, plots, graphs, charts, or other components, and information included in such components may be empirically determined through vehicle testing in a variety of operating conditions. Additionally or alternatively, such power, speed, acceleration, torque, and/or other demands associated with the respective vehicle systems may be estimated (e.g., predicted or projected) by the predictive control system 148 by entering velocity information, acceleration information, road grade information, lateral motion information, and/or other information associated with and/or indicative of the planned travel path 146 as inputs into one or more torque algorithms, power algorithms, and/or other demand estimation algorithms. In still further examples, the predictive control system 148 may leverage one or more artificial intelligence, machine learning, and/or other decision-making components associated with the vehicle computing device in order to predict, project, and/or otherwise estimate such a demand.

The predictive control system 148 may also be configured to generate and/or otherwise determine a control strategy corresponding to one or more of the vehicle systems described herein based at least in part on the estimated demand of the respective vehicle systems. For instance, in the example above the predictive control system 148 may determine a control strategy corresponding to the powertrain based at least in part on the estimated power and/or torque demand of the powertrain. In such examples, an estimated increase in torque demand may, for example, result in the predictive control system 148 determining a control strategy that includes transitioning the powertrain from a front-wheel drive operating mode to an all-wheel drive operating mode. In other examples, such an estimated increase in torque demand may result in the predictive control system 148 determining a control strategy that includes maintaining the powertrain in an all-wheel drive operating mode for an extended period of time (e.g., while the vehicle 102 traverses a portion of the road 106 having a relatively flat grade) although a short-term transition from the all-wheel operating mode to the front-wheel drive operating mode may have been acceptable (or even preferable) during that time. In such examples, maintaining the powertrain in the all-wheel drive operating mode for such an extended period of time may eliminate unnecessary rear-wheel drive motor and/or clutch engagement associated with transitioning the powertrain from the front-wheel drive operating mode to the all-wheel drive operating mode. Accordingly, such a control strategy may result in an overall power savings, and may assist in increasing the overall efficiency of the vehicle 102 by reducing the amount of vehicle resources used in traversing the planned travel path 146. As will be described in greater detail below, in further examples, the predictive control system 148 may be configured to determine individual control strategies for one or more respective vehicle systems based at least in part on the estimated demand. For example, in addition to the powertrain control strategy described above, the predictive control system 148 may also determine an additional control strategy corresponding to the braking system of the vehicle, a further control strategy corresponding to the suspension system of the vehicle 102, and/or other control strategies configured to assist the vehicle 102 in satisfying the estimated increased torque demand. Any of the control strategies described herein may be executed by the respective vehicle systems sequentially, substantially simultaneously, and/or in any other order or timing sequence in order to satisfy the corresponding estimated demands.

It is understood that in example embodiments of the present disclosure, the remote computing devices described herein may provide one or more of the vehicles 102 with drive envelopes 138, planned travel paths 146, control strategies, and/or other information that may be used by the local vehicle computing devices of the respective vehicles 102 to govern operation of the respective vehicle 102. For example any of the methods and/or operations described herein with respect to a local vehicle computing device may be performed by one or more remote computing devices in communication with the vehicle computing device via the network. In such examples, the various drive envelopes 138, planned travel paths 146, trajectories, travel routes, system demands, control strategies, modified control strategies, and/or other operational parameters described herein may be determined, calculated, generated, and/or provided by at least one of the remote computing devices.

Figure 2:
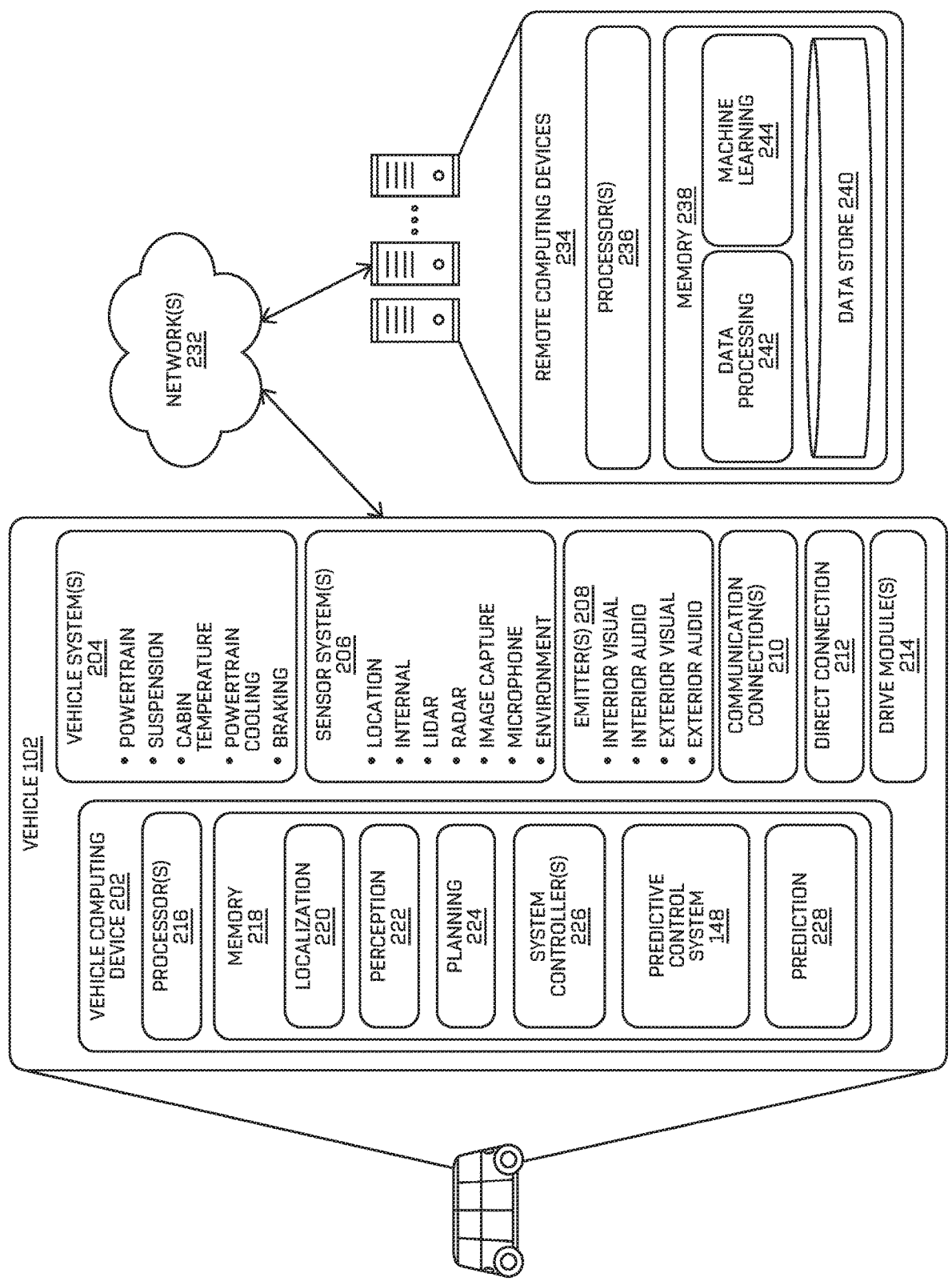
FIG. 2 is a block diagram illustrating an example vehicle system architecture.

FIG. 2 is a block diagram illustrating an example system for implementing one or more of the example processes described herein. For example, the system may be configured to determine a drive envelope 138 and/or a corresponding planned travel path 146 of a vehicle 102, predict, project, and/or otherwise estimate a demand of one or more vehicle systems based at least in part on such a planned travel path 146, determine respective control strategies corresponding to one or more such vehicle systems, and cause operation of such vehicle systems in accordance with the respective control strategies. In at least one example, the system of FIG. 2 can include a vehicle, which can be the same vehicle 102 described above with reference to FIG. 1.

As shown in FIG. 2, and as described above, the vehicle 102 can include a vehicle computing device 202, one or more actively controlled vehicle systems 204, one or more sensor systems 206, one or more emitters 208, one or more communication connections 210, at least one direct connection 212, and one or more drive modules 214.

The vehicle computing device 202 can include one or more processors 216, and memory 218 communicatively coupled with the one or more processors 216. In the illustrated example, the vehicle 102 may comprise an autonomous vehicle. However, in further examples the vehicle 102 could be any other type of vehicle. In the illustrated example, the memory 218 of the vehicle computing device 202 stores a localization system 220, a perception system 222, a planning system 224, one or more system controllers 226, and a prediction system 228. As shown in FIG. 2, in some examples, the one or more system controllers 226 may include the predictive control system 148 described above with respect to FIG. 1. Though depicted in FIG. 2 as residing in memory 218 for illustrative purposes, it is contemplated that the perception system 222, planning system 224, system controllers 226, the predictive control system 148, and/or other components of the vehicle computing device 202 may, additionally or alternatively, be accessible to the vehicle 102 (e.g., stored remotely).

In at least one example, the localization system 220 can determine where the vehicle 102 is in relation to a local and/or global map based at least in part on sensor data received from the sensor system(s) 206, the perception system 222 to perform entity detection, segmentation, and/or classification based at least in part on sensor data received from the sensor system(s) 206, and the planning system 224 to determine routes, drive envelopes 138, and/or planned travel paths 146 used to control the vehicle 102 based at least in part on sensor data received from the sensor system(s) 206. Additional details of localizer systems, perception systems, and planning systems that are usable can be found in U.S. patent application Ser. No. 14/922,962, filed Nov. 4, 2015, entitled "Adaptive Mapping to Navigate Autonomous Vehicle Responsive to Physical Environment Changes," and Ser. No. 15/622,208, filed Jun. 22, 2017, entitled "Trajectory Generation and Execution Architecture," both of which are incorporated herein by reference. In an example where the vehicle 102 is not an autonomous vehicle, one or more such components can be omitted from the vehicle 102.

In at least one example, the localization system 220, perception system 222, and/or the planning system 224 can process sensor data received from the sensor system(s), and can send their respective outputs, over one or more network(s) 232, to one or more remote computing device(s) 234 (e.g., one or more server computers or other computing devices). In such examples, the sensor system(s) 206 may include one or more of an image capture device, a light detection and ranging (LIDAR) sensor, a radio detection and ranging (RADAR) sensor, a sound navigation and ranging (SONAR) sensor, a thermal radiation detector, and/or other sensors. In at least one example, the localization system 220, perception system 222, and/or the planning system 224 can send their respective outputs to the one or more remote computing device(s) 224 at a particular frequency, after a lapse of a predetermined period of time, in near real-time, etc.

In at least one example, the one or more system controller(s) 226 can be configured to control steering, suspension, powertrain (e.g., propulsion), braking, cabin temperature (e.g., cabin heating and/or cooling), powertrain cooling, safety, and other vehicle systems 204 of the vehicle 102. The system controller(s) 226 may also be configured to control the emitters 208 and/or the communication connections 210 of the vehicle 102. Further, the system controller(s) 226 can communicate with and/or control corresponding systems of the drive module(s) 214 and/or other components of the vehicle 102. In any of the examples described herein, one or more of the control strategies determined by the predictive control system 148 may be provided to the respective system controllers 226, and the respective system controllers 226 may cause corresponding vehicle systems 204 to operate in accordance with such control strategies.

In at least one example, the prediction system 228 can receive sensor data directly from the sensor system(s) 206 and/or from one of the other systems (e.g., the localization system 220, the perception system 222, etc.). In some examples, if the prediction system 228 receives sensor data from the sensor system(s) 206, the sensor data can be raw sensor data. In additional and/or alternative examples, if the prediction system 228 receives sensor data from one of the other systems, the sensor data can be processed sensor data. For instance, in an example, the localization system 220 can process data captured by an image capture device of the vehicle 102, LIDAR sensor data, and/or other sensor data to determine where the vehicle 102 is in relation to a local and/or global map and can output processed sensor data (e.g., location data) indicating such information. Additionally and/or alternatively, the perception system 222 can process the sensor data to perform object detection, segmentation, and/or classification. In some examples, the perception system 222 can provide processed sensor data that indicates the presence of an object that is proximate to the vehicle 102 and/or a classification of the object as an object type (e.g., car, pedestrian, cyclist, barrier, road sign, unknown, etc.). In additional and/or alternative examples, the perception system 222 can provide processed sensor data that indicates one or more characteristics associated with a detected entity and/or the environment in which the entity is positioned. In some examples, characteristics associated with an object identified by the perception system 222 can include, but are not limited to, an x-position (global and/or local position), a y-position (global position and/or local), a z-position (global position and/or local), an orientation (e.g. any of a roll, pitch, and/or yaw), an object type (e.g., a classification), a velocity of the object, etc. Characteristics associated with the environment can include, but are not limited to, a presence of another object in the environment, a state of another object in the environment, a time of day, a day of a week, a season, a weather condition, an indication of darkness/light, etc.

For example, sensor system(s) 206 may include image capture devices, such as any cameras (e.g., RGB-cameras, monochrome cameras, intensity (grey scale) cameras, infrared cameras, ultraviolet cameras, depth cameras, stereo cameras, and the like). Such image capture devices may capture image data, and the sensor system(s) 206 may transmit image data to the perception system 222 and/or other systems of the vehicle computing device 202 for subsequent processing.

Likewise, the sensor system(s) 206 may include one or more LIDAR sensors configured to capture LIDAR sensor data for use, as described herein. For example, the sensor system(s) 206 may be configured to combine or synthesize LIDAR data from a plurality of LIDAR sensors 104 to generate a meta spin of LIDAR data, which may be LIDAR sensor data generated by multiple LIDAR sensors. In the case of a meta spin of LIDAR data, the sensor system(s) 206 may be configured to determine a virtual origin (e.g., common origin) of the meta spin data. In some examples, the sensor system(s) 206 may be configured to determine a range between a LIDAR sensor and a point of an object or surface, and in some examples, the sensor system(s) 206 may be configured to determine a surface normal vector for each point captured and/or sensed by a respective LIDAR sensor. As may be understood in the context of this disclosure, the sensor system(s) 206 may transmit any such LIDAR sensor data to the perception system 222 and/or other systems of the vehicle computing device 202 for subsequent processing.

In some examples, the sensor system(s) 206 may provide image data, LIDAR sensor data, and/or other sensor data to the vehicle computing device 202 for combining, fusing, segmenting, classifying, labeling, synthesizing, and/or otherwise processing the data. In some examples, the memory 218 of the vehicle computing device 202 may also store simulated data that has been generated by a computer simulation algorithm, for use in part in testing. In some examples, the simulated data may include any type of simulated data, such as image data, sensor data (e.g., LIDAR data, RADAR data, and/or SONAR data), GPS data, etc. In some examples, the computer system(s) 102 may be configured to modify, transform, and/or perform converting operations on the simulated data for verifying an operation and/or for training models executable by machine learning systems.

In some examples, the prediction system 228 can access a heat map and/or other information stored in the memory 218, and can perform a look-up using such information to assist in predicting future behaviors of the identified object. In at least one example, the heat map and/or other information stored in the memory 218 can be associated with an object type (e.g., car, pedestrian, cyclist, barrier, road sign, unknown, etc.). In at least one example, the prediction system 228 can perform a look-up to determine a pattern of behavior associated with the detected object type. In at least one example, the prediction system 228 can utilize a location of an object and one or more characteristics to identify a cell in a heat map. That is, a cell can be indicative of, or otherwise be referenced by, a unique index comprising the location of the object and one or more characteristics associated with the object and/or the environment in which the object is present. In some examples, the cell can be associated with data indicative of a pattern of behavior of one or more objects (of a same object type) in the location having the same one or more characteristics of the object and/or the environment. The prediction system 228 can retrieve the data indicative of the pattern of behavior associated with the cell and can utilize the data indicative of the pattern of behavior to determine a predicted behavior of the object.

Based at least in part on determining a predicted behavior of an object, the prediction system 228 can provide an indication of the predicted behavior to other systems of the vehicle computing device 202. In at least one example, the predicted behavior can be used to inform the perception system 222 for performing object detection, segmentation, and/or classification (e.g., in an example, a heat map and/or other information related to an identified object 122 can be used for performing an inverse look-up to determine an object type). Additionally and/or alternatively, the planning system 224 can utilize the predicted behavior for determining a planned travel path 146 along which the vehicle 102 can travel and/or a drive envelope 138 defining such a planned travel path 146. The planning system 224 can send the drive envelope 138, the planned travel path 146, and/or other information indicative of the drive envelope 138 and/or of the planned travel path 146 to the system controller(s) 226. In some examples, the planning system 224 may send information indicative of the drive envelope 138 and/or of the planned travel path 146 to the predictive control system 148. As will be described below, the predictive control system 148 may estimate a demand associated with the vehicle 102 traversing the planned travel path 146, and may determine one or more control strategies based at least in part on such a demand. The predictive control system 148 and or the one or more system controller(s) 226 may also cause corresponding vehicle systems 204 to operate in accordance with such control strategies. For example, one or more of the system controller(s) may cause the powertrain of the vehicle 102 to drive along the planned travel path 146 (e.g., in the example of an autonomous vehicle), at a desired speed, and at a desired torque level. Such a desired torque level may be achieved by, for example, operating the vehicle 102 in a front-wheel drive operating mode, operating the vehicle 102 in an all-wheel drive operating mode, causing the powertrain to change gears, causing the powertrain to engage/disengage one or more motors of the vehicle 102, and/or by any other means, in accordance with a corresponding powertrain control strategy determined by the predictive control system 148. Furthermore, the estimated (e.g., predicted) demand can be used by a neural network and/or other machine learning components to control future operations of the respective vehicle systems 206. Additionally, in any of the examples described herein, control strategies of the present disclosure may be used to modify the configuration, operation, load, actions, performance, efficiency, activation, deactivation, engagement, disengagement, charging, discharging, and/or other parameters of any system of the vehicle 102 and/or components thereof. In such examples, the estimated (e.g., predicted) demand of such systems and/or components may be used to modify the operation of the vehicle 102, modify the planned travel path 146, and/or modify any of the other operating parameters described herein.

The vehicle system(s) 204 of the vehicle 102 may include any active or passive system described herein. As noted above, such vehicle systems 102 may include, among other things, a powertrain, a suspension system, a cabin temperature system, a powertrain cooling system, a braking system, and/or other such systems. For example, the powertrain may include one or more motors configured to propel the vehicle 102, as well as one or more clutches, drive shafts, gears, and/or other components configured to transfer power from respective motors of the powertrain to one or more wheels 128 of the vehicle 102. In some examples, the vehicle 102 may include a first electric motor configured to drive rotation of a first pair of wheels 128 (e.g., front wheels) of the vehicle 102, and a second electric motor configured to drive rotation of a second pair of wheels 128 (e.g., rear wheels) of the vehicle 102. In front-wheel drive operating mode, the first motor may be operated (e.g., engaged via one or more clutches of the powertrain) to drive rotation of the first pair of wheels 128. In rear-wheel drive operating mode, the second moor may be operated (e.g., engaged via one or more additional clutches of the powertrain) to drive rotation of the second pair of wheels 128. Further, in all-wheel drive operating mode, the first and second motors may be operated simultaneously to drive rotation of all four wheels 128 of the vehicle 102.

In some examples, the braking system may include one or more hydraulic or electric actuators configured to move brake pads, calipers, and/or other resistive braking components relative to a rim or other component of each respective wheel 128. The suspension system may also include one or more hydraulic and/or pneumatic components configured to change a ride height of the vehicle 102 according to road conditions, vehicle speed, or other factors. The cabin temperature system may comprise an HVAC system that includes a radiator, one or more cooling fans, one or more heaters, and/or other components configured to actively raise or lower a temperature within the cabin, passenger compartment, or other space defined by the vehicle 102. In some examples, the cabin temperature system may be configured to direct heat from one or more motors, batteries, and/or other heat storage components of the vehicle 102 to the cabin for affecting the temperature within the cabin. Similarly, the powertrain cooling system may include one or more radiators, fans, shutters, fins, vanes, louvers, heat sinks, and/or other components configured to convectively and/or conductively reduce the temperature of the one or more motors, batteries, and/or other components of the powertrain. In some examples, one or more radiators, fans, and/or other components described herein may be components of both the cabin temperature system and the powertrain cooling system.

In at least one example, the sensor system(s) 206 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras and/or other image capture devices (e.g., RGB, IR, intensity, depth, etc.), microphones, wheel encoders, environment sensors (e.g., temperature sensors, humidity sensors, light sensors, pressure sensors, etc.), etc. The sensor system(s) 206 can include multiple instances of each of these or other types of sensors. For instance, the LIDAR sensors can include individual LIDAR sensors located at the corners, front, back, sides, and/or top of the vehicle 102. As another example, cameras and/or other image capture devices can include multiple cameras disposed at various locations about the exterior and/or interior of the vehicle 102.

The vehicle 102 can also include one or more emitters 208 for emitting light and/or sound, as described above. The emitters 208 in this example include interior audio and visual emitters to communicate with passengers of the vehicle 102. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles.

The vehicle 102 can also include one or more communication connection(s) 210 that enable communication between the vehicle 102 and one or more other local or remote computing device(s). For instance, the communication connection(s) 210 can facilitate communication with other local computing device(s) on the vehicle 102 and/or the drive module(s) 214. Also, the communication connection(s) 210 can allow the vehicle 102 to communicate with other nearby computing device(s) (e.g., other nearby vehicles, traffic signals, etc.). The communications connection(s) 210 also enable the vehicle 102 to communicate with a remote teleoperations computing device, a remote service center, or other remote services.

The communications connection(s) 210 can include physical and/or logical interfaces for connecting the vehicle computing device 202 to another computing device or a network, such as network(s) 232. For example, the communications connection(s) 210 can enable Wi-Fi-based communication such as via frequencies defined by the IEEE 802.11 standards, short range wireless frequencies such as Bluetooth®, or any suitable wired or wireless communications protocol that enables the respective computing device to interface with the other computing device(s).

In at least one example, the vehicle 102 can include one or more drive modules 214. In some examples, the vehicle 102 can have a single drive module 214. In at least one example, if the vehicle 102 has multiple drive modules 214, individual drive modules 214 can be positioned on opposite ends of the vehicle 102 (e.g., the front and the rear, etc.). In at least one example, the drive module(s) 214 can include one or more sensor systems to detect conditions of the drive module(s) 214 and/or the surroundings of the vehicle 102. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 214. In some cases, the sensor system(s) on the drive module(s) 214 and/or other systems of the drive module(s) 214 can overlap or supplement corresponding systems of the vehicle 102 (e.g., the vehicle system(s) 204 and/or the sensor system(s) 206).

For example, the drive module(s) 214 can include one or more additional or redundant vehicle systems, such as a high voltage battery, an inverter to convert direct current from the battery into alternating current for use by other vehicle systems, a steering system including a steering motor and steering rack (which can be electric), a stability control system for distributing brake forces to mitigate loss of traction and maintain control, lighting systems (e.g., lighting such as head/tail lights to illuminate an exterior surrounding of the vehicle), and one or more other systems (e.g., safety systems, onboard charging systems, other electrical components such as a DC/DC converter, a high voltage junction, a high voltage cable, charging system, charge port, etc.). Additionally, the drive module(s) 214 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 214. Furthermore, the drive module(s) 214 also include one or more communication connection(s) that enable communication by the respective drive module with one or more other local or remote computing device(s).

As described above, the vehicle 102 can send signals and/or sensor data to one or more remote computing device(s) 234, via the network(s) 232. In some examples, the vehicle 102 can send raw sensor data to the remote computing device(s) 234. In other examples, the vehicle 102 can send processed sensor data and/or representations of sensor data to the remote computing device(s) 234. In some examples, the vehicle 102 can send sensor data to the remote computing device(s) 234 at a particular frequency, after a lapse of a predetermined period of time, in near real-time, etc.

The remote computing device(s) 234 can receive the signals and/or sensor data (raw or processed) and can perform any of the processes described herein based at least in part on the signals and/or sensor data. In at least one example, the remote computing device(s) 234 can include one or more processors 236 and memory 238 communicatively coupled with the one or more processors 236. In the illustrated example, the memory 238 of the remote computing device(s) 234 stores a data store 240, a data processing system 242, and a machine learning system 244.

The data store 240 can store sensor data (raw or processed) received from one or more vehicles, such as vehicle 102. The sensor data in the data store 240 can represent sensor data collected by one or more onboard sensor systems (e.g., such as onboard sensor system(s) 206), or other sensor system(s), at previous time(s) (e.g., previously connected sensor data). In some examples, the sensor data can be stored in association with locations, object types, and/or other types of characteristics. Additionally, in at least one example, behaviors determined from the sensor data can be stored in the data store 240. That is, the behaviors of individual objects can be associated with particular sensor data from which the behaviors were determined. Further, the data store 240 may store any of the drive envelopes 138, planned travel paths 146, estimated demands, control strategies, and/or other information described herein.

In at least one example, the data processing system 242 can receive sensor data (raw or processed) from one or more vehicles, such as the vehicle 102. As described above, the vehicle 102 can send signals including sensor data to the remote computing device(s) 234 at a particular frequency, after a lapse of a predetermined period of time, in near real-time, etc. Accordingly, the data processing system 242 can receive the sensor data at a particular frequency, after a lapse of a predetermined period of time, in near real-time, etc. In additional and/or alternative examples, the data processing system 242 can receive data from additional and/or alternative sensor system(s) (e.g., that are not associated with a vehicle). In some examples, the data processing system 242 can send the sensor data to the data store 240 for storage. Further, the data processing system 242 may receive and/or process any of the drive envelopes 138, planned travel paths 146, estimated demands, control strategies, and/or other information described herein.

In at least one example, the data processing system 242 can process sensor data, and can determine a behavior of an object associated with a particular object type based on the sensor data. That is, the data processing system 242 can analyze sensor data associated with a particular period of time to determine how objects(s) present in an environment behave during the period of time. In at least one example, the data store 240 can store data indicative of a behavior of an object that is associated with an object type, which can be associated in the data store 240 with sensor data utilized to determine the behavior. In at least one example, data indicative of a behavior of an object associated with an object type, as determined from sensor data, can be associated with an observation. Such observations can be stored in the data store 240.

As noted above, the localization system 220, the perception system 222 and/or other components of the vehicle computing device 202 may be configured to detect and classify external objects, such as, for example, pedestrians, bicyclists, dogs, other vehicles, etc. Based at least in part on the classifications of the external objects, the external objects may be labeled as dynamic objects or static objects. For example, the perception system 222 may be configured to label a tree as a static object, and may be configured to label a pedestrian as a dynamic object. Further data about external objects may be generated by tracking the external objects, and the object classification type may be used by the prediction system 228, in some examples, to predict or determine the likelihood that an external object may interfere with the vehicle 102 as it travels along a planned travel path 146. For example, an external object that is classified as a pedestrian may be associated with a maximum speed and/or an average speed. The localization system 220, the perception system 222, a segmentation system of the vehicle computing device 202, the data processing system 242, and/or other components of the remote computing devices 234 may use the machine learning system 244, which may execute any one or more machine learning algorithms, such as, for example, neural networks, to perform classification operations.

A neural network utilized by the machine learning system 244 may comprise a biologically inspired algorithm, which passes input data through a series of connected layers to produce an output. One example of a neural network is the convolutional neural network (CNN). Each layer in a CNN may also include another CNN, or may include any number of layers. A neural network may utilize machine learning, which is a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 2 (ID2), Chi-squared automatic interaction detection (CHAID), decision stump, conditional decision trees)), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, backpropagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

In some examples, more than one type of machine learning system may be used to provide respective results for each of the types of machine learning used. In some examples, a confidence score may be associated with each of the results, and the result relied on may be based at least in part on the confidence score associated with the result. For example, the result associated with the highest confidence score may be selected over other results, or the results may be combined based on the confidence scores, for example, based on statistical methods, such as weighted averages, etc. Additionally, although the machine learning system 244 is illustrated as a component of the memory 238, in other examples, the machine learning system 244 and/or at least a portion thereof, may comprise a component of the memory 218 of the vehicle computing device 202.

The processor(s) 216 of the vehicle 102 and the processor(s) 236 of the remote computing device(s) 234 can be any suitable processor capable of executing instructions to process data and perform operations as described herein. By way of example and not limitation, the processor(s) 216 and 236 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and memory 238 are examples of non-transitory computer-readable media. Memory 218 and memory 238 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 2 is illustrated as a distributed system, in alternative examples, components of the vehicle 102 can be associated with the remote computing device(s) 234 and/or components of the remote computing device(s) 234 can be associated with the vehicle 102. That is, the vehicle 102 can perform one or more of the functions associated with the remote computing device(s) 234, and vice versa.

As noted above, a system load, resource requirement, and/or other demand associated with respective vehicle systems 204 may be determined by the predictive control system 148 based at least in part on a planned travel path 146 to be traversed by the vehicle 102. In some examples, the predictive control system 148 may determine the respective demands based on empirical data calculated, collected, estimated, and/or otherwise determined during various testing exercises and/or during operation of the vehicle 102. In some examples, such respective demands may be determined for each planned travel path 146 associated with the vehicle 102 traveling between a current location of the vehicle 102 (e.g., a location 120) and a desired destination 124. In such examples, the planning system 224 may determine a series of sequential drive envelopes 138 and/or planned travel paths 146 extending from the location 120 to the destination 124, and the predictive control system 148 may determine various vehicle system demands corresponding to one or more (e.g., each) of the respective sequential drive envelopes 138 and/or planned travel paths 146.

Figure 3:
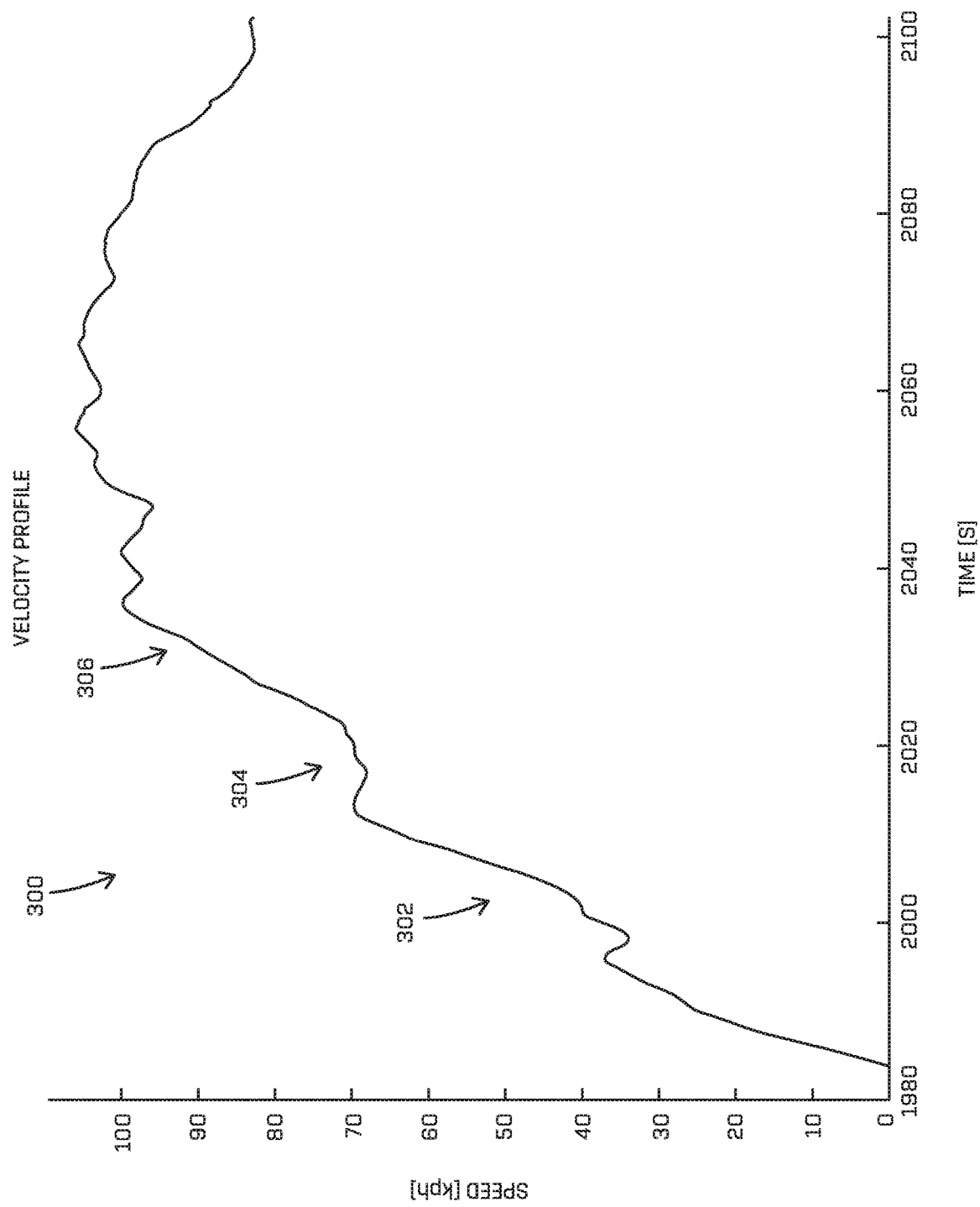
FIG. 3 illustrates a velocity profile associated with an example vehicle of the present disclosure.
Figure 4:
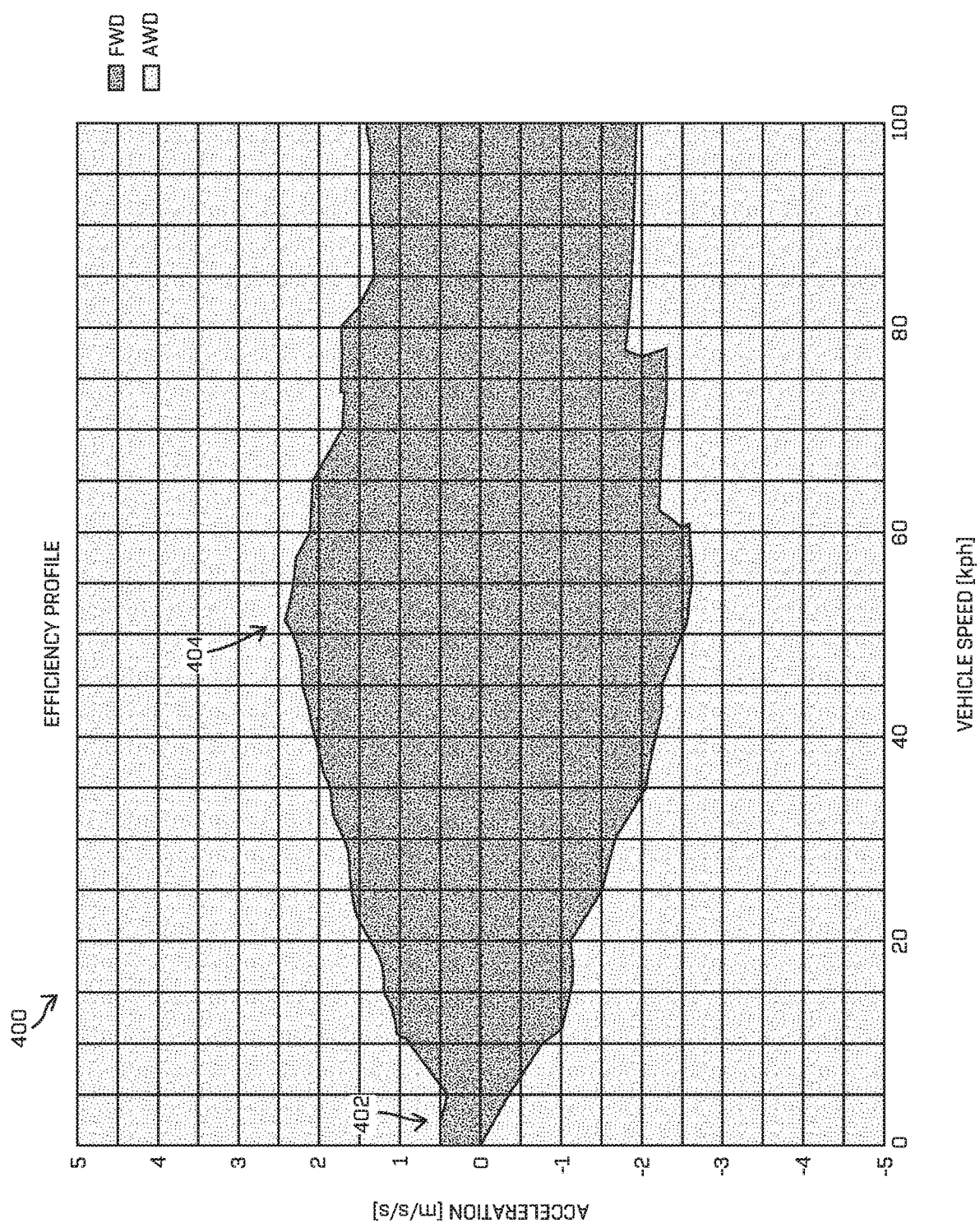
FIG. 4 illustrates an efficiency profile associated with an example vehicle of the present disclosure. The example efficiency profile shown in FIG. 4 indicates the most efficient operating mode of the vehicle (front-wheel drive or all-wheel drive) based on the speed and acceleration of the vehicle.
Figure 5:
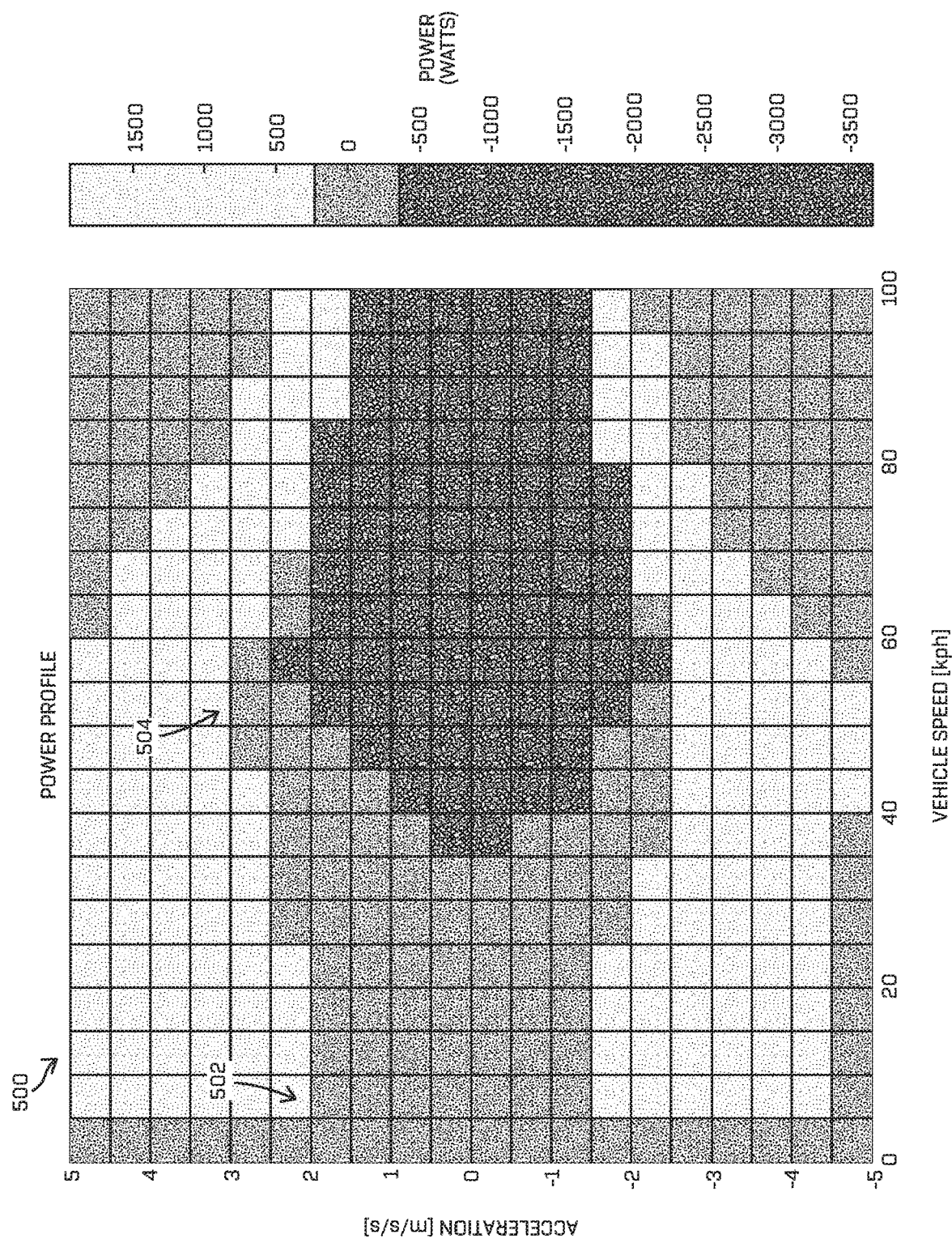
FIG. 5 illustrates a power profile associated with an example vehicle of the present disclosure. The example power profile shown in FIG. 5 corresponds to the example efficiency profile of FIG. 4, and the power profile indicates, for various vehicle speeds and accelerations, the difference in the amount of power required to operate the vehicle 102 in front-wheel drive versus all-wheel drive.

By way of non-limiting example, FIGS. 3-5 illustrate example data (e.g., empirical data, simulation data, data derived from component manufacturer specifications, etc.) that could be used by the predictive control system 148 to estimate a demand of a system of the vehicle 102 (e.g., a power, velocity, acceleration, and/or torque demand of the powertrain) corresponding to, caused by, required for, and/or otherwise associated with the vehicle 102 traversing one or more planned travel paths 146. The example empirical data illustrated in FIGS. 3-5 may also be used by the predictive control system 148 to determine one or more control strategies based on the estimated demands associated with various vehicle system 204. While FIGS. 3-5 will be explained below with respect to powertrain demands and corresponding control strategies, in further examples, similar empirical data may be used to estimate demands and/or to determine control strategies associated with the suspension system, the cabin temperature system, the powertrain cooling system, the braking system, the safety system, and/or other vehicle system(s) 204 or drive module(s) 214. Additionally, as noted above, in any of the examples described herein, one or more demands associated with the respective vehicle systems may be estimated by the predictive control system 148 by entering velocity information, acceleration information, torque information, road grade information, lateral motion information, temperature information, weather forecasts, and/or other information associated with and/or indicative of a planned travel path 146 as inputs into one or more demand estimation algorithms. In still further examples, the predictive control system 148 may leverage one or more artificial intelligence, machine learning, and/or other decision-making components associated with the vehicle computing device in order to estimate such vehicle system demands.

FIG. 3 shows an example velocity profile 300 associated with a vehicle 102 of the present disclosure. Such a velocity profile 300 may comprise a graphical illustration of the speed of the vehicle 102 as it travels along a trajectory or other route extending from an example location 120 (in this example, beginning at a speed of zero) toward a desired destination 124. In the example illustrated in FIG. 3, the vehicle 102 may traverse one or more planned travel paths 146 (e.g., a series of sequential planned travel paths 146) beginning proximate time 1980$s$ through time 2100$s$. For example, as illustrated in a first portion 302 of the velocity profile 300, the vehicle 102 may accelerate from a speed of zero to a speed of approximately 70 kph as the vehicle traverses one or more planned travel paths 146 from approximately time 1980$s$ to approximately time 2015$s$. The acceleration associated with the first portion 302 of the velocity profile 300 may be relatively rapid (e.g., may be greater than or equal to a predetermined acceleration threshold). As illustrated in a second portion 304 of the velocity profile 300, the vehicle 102 may then decelerate and/or may travel at a relatively constant speed (e.g., approximately 70 kph) as the vehicle traverses one or more additional planned travel paths 146 from approximately time 2016$s$ to approximately time 2025$s$. The acceleration associated with the second portion 304 of the velocity profile 300 may be relatively minimal (e.g., may be less than a predetermined acceleration threshold). Further, as illustrated in a third portion 306 of the velocity profile 300, the vehicle 102 may then accelerate from a speed of approximately 70 kph to a speed of approximately 100 kph as the vehicle traverses one or more additional planned travel paths 146 from approximately time 2026$s$ to approximately time 2040$s$. Similar to the acceleration associated with the first portion 302, the acceleration associated with the third portion 306 of the velocity profile 300 may be relatively rapid (e.g., may be greater than or equal to a predetermined acceleration threshold). In some examples, the information illustrated in FIG. 3 may be used by the predictive control system 148 to estimate a respective demand of one or more vehicle systems 204 (e.g., the powertrain, the powertrain cooling system, etc.) associated with the vehicle 102 traversing the sequential planned travel paths 146 corresponding to the portions 302, 304, 306.

For instance, before and/or while the vehicle 102 traverses one or more planned travel paths 146 corresponding to the first portion 302 and/or the third portion 306 of the velocity profile 300, the predictive control system 148 and/or other systems of the vehicle 102 may estimate the torque, power, and/or other demands of the powertrain and/or other vehicle systems 204 that will be required to achieve the vehicle speeds and/or accelerations associated with the first portion 302 and/or the third portion 306. Based on such demands, the predictive control system 148 may determine control strategies that may require all-wheel drive operation of the vehicle 102 while traversing planned travel paths 146 corresponding to the first portion 302 and/or the third portion 306. Such control strategies may be determined by the predictive control system 148 based at least in part on the efficiency profile 400 of FIG. 4 and/or the power profile 500 of FIG. 5. Additionally, such a control strategy may coincide with known "reactive" control strategies in which vehicles are operated in all-wheel drive mode during periods of relatively rapid acceleration in order to optimize efficiency (e.g., in order to minimize the amount of power required to achieve such relatively rapid acceleration). Though described in the context of optimizing efficiency, it should be noted that the techniques described herein need not be so limiting. As non-limiting examples, the predictive control system 148 can, based on the selected planned travel paths 146, determine optimal control of systems and/or subsystems to effectuate optimal temperature differentials, optimal power consumption (either conservation of energy or dissipation of energy), optimal speeds, and the like, where such control may not necessarily be the most energy efficient. In any of the examples described herein, one or more such control strategies may result in improved passenger safety, improved passenger comfort, and/or an overall improvement in ride experience, even though such control strategies may require a suboptimal use of vehicle power, energy, or other resources.

However, in some examples, before and/or while the vehicle 102 traverses one or more planned travel paths 146 corresponding to the second portion 304 of the velocity profile 300 the predictive control system 148 and/or other systems of the vehicle 102 may estimate the torque, power, and/or other demands of the powertrain and/or other vehicle systems 204 that will be required to achieve the vehicle speeds and/or accelerations associated with the second portion 304, and such estimations may be made based at least in part on the future demands associated with the planned travel paths 146 associated with the third portion 306 of the velocity profile 300, as well as the efficiency profile 400 of FIG. 4 and/or the power profile 500 of FIG. 5. For example, such demand estimations may be made by the predictive control system 148 based on the speed, acceleration, torque, road grade, and/or other characteristics of the planned travel paths 146 associated with the third portion 306 of the velocity profile 306.

For example, information indicating that one or more future travel paths 146 associated with the third portion 306 of the velocity profile 306 (e.g., sequentially following the one or more planned travel paths 146 associated with the second portion 304 of the velocity profile 304) require the relatively rapid acceleration described above, may cause the predictive control system 148 to estimate a relatively high future powertrain demand associated with the vehicle 102 traversing the planned travel paths 146 associated with the third portion 306. As a result, based at least in part on such information the predictive control system 148 may determine a control strategy corresponding to the powertrain that requires the vehicle 102 to continue operating in all-wheel drive mode as the vehicle 102 traverses the one or more drive paths 146 corresponding to the second portion 304 of the velocity profile 300. In such examples, such a control strategy may be contrary to control strategies employed by known "reactive" control systems in which vehicles would typically be transitioned from an all-wheel drive operating mode to a front-wheel drive operating mode when minimal or a relatively low level of acceleration is required. The control strategy determined by the predictive control system 148 corresponding to the one or more drive paths 146 associated with the second portion 304 of the velocity profile 300 (e.g., maintaining operation of the vehicle 102 in all-wheel drive mode) may minimize unnecessary engagement and disengagement of various clutches, motors, and/or other components of the drivetrain over the entire trajectory or route between the location 120 and the destination 124. As a result, the various control strategies and/or other methods described herein may result in significant power savings and corresponding increases in vehicle efficiency relative to known reactive control systems/strategies, in addition to any passenger comfort realized by smooth transitions based on such anticipated demand.

In examples in which the vehicle 102 comprises an autonomous vehicle or other vehicle propelled by electric motors, any acceleration or deceleration of the vehicle 102 may require expending at least some power. Such required power may comprise a demand of one or more motors, clutches, and/or other components of the powertrain required to produce the requested acceleration or deceleration. Further, depending on the mode of operation of the vehicle 102 (e.g., front-wheel drive, all-wheel drive, etc.), the amount of power required by the powertrain to produce a requested acceleration or deceleration may differ. For example, the power profile 500 of FIG. 5 illustrates, for various speeds and accelerations, the difference in the magnitude of power (e.g., watts) required to operate the vehicle 102 in front-wheel drive mode versus all-wheel drive mode. At some speed and/or acceleration ranges, the difference in the amount of power required by the powertrain to operate the vehicle 102 in front-wheel drive mode versus all-wheel drive mode may be relatively low. For example, when operating the vehicle 102 at low to moderate speeds (e.g., speeds between approximately 0 kph and approximately 50 kph) and at relatively low rates of acceleration (e.g., acceleration rates between approximately 2 m/s$^2$ and approximately −2 m/s$^2$), there may be a relatively small difference in the amount of power required to operate the vehicle 102 in front-wheel drive mode versus all-wheel drive mode (e.g., a power difference between approximately 0 watts and approximately 500 watts). Such relatively low power differences are represented by, for example, the portions 502, 504 of the power profile 500 of FIG. 5. As illustrated by the corresponding portions 402, 404 of the efficiency profile 400 of FIG. 4, simulations based on expected kinematic requirements, empirical testing, machine learning, fuzzy logic networks, and/or other efficiency evaluation processes may indicate that it may be more efficient, from a power/demand perspective, to operate the vehicle 102 in front-wheel drive mode (or rear-wheel drive mode), rather than in all-wheel drive mode, while the vehicle 102 traverses planned travel paths 146 at such low to moderate speeds and at such low rates of acceleration. Such portions 502, 504 of the power profile 500 and portions 402, 404 of the efficiency profile 400 may correspond to the speeds (and/or accelerations) illustrated with respect to the second portion 304 of the velocity profile 300 described above.

However, without considering demand estimations made based on the speed, acceleration, torque, road grade, and/or other characteristics of the planned travel paths 146 associated with the third portion 306 of the velocity profile 306 (e.g., future travel paths), the data illustrated by the power profile 500 and the efficiency profile 400 may cause "reactive" control systems to generate a control strategy requiring vehicles to transition from an all-wheel drive operating mode to a front-wheel drive operating mode when minimal or a relatively low level of acceleration is required (e.g., such as while the vehicle traverses planned travel paths 146 similar to those associated with the second portion 304 of the velocity profile 300). Operating such vehicles in this way would increase net power usage due to increased engaging and disengaging of clutches, drive motors, and/or other powertrain components over the course of the route between the location 120 and the destination 124, and thus, would result in reduced vehicle efficiency. The methods and processes described herein overcome these and other deficiencies associated with such reactive control systems by determining control strategies that are based at least in part on characteristics of one or more future travel paths 146 yet to be traversed by the vehicle 102, and the demands associated with the vehicle 102 traversing such future travel paths 146.

As noted above, while the information illustrated in FIGS. 3-5 relates primarily to speed, acceleration, power, efficiency, and/or other characteristics of the powertrain, in further examples, similar information (e.g., temperature information, heat flow information, forecast information, historical performance information, braking information, roll information, pitch information, yaw information, etc.) and/or processes may be used by the predictive control system 148 to estimate demands and/or to determine control strategies associated with any of the other vehicle system(s) 204 and/or drive module(s) 214 discussed herein. For example, in further embodiments the predictive control system 148 may be aware, based on historical information, saved programs, received instructions, or other information that one or more doors of the vehicle 102 may be opened by a passenger at some time in the future. For example, based on one or more of the planned travel paths 146, the predictive control system 148 may be aware that the vehicle 102 will arrive at the desired destination 124 in approximately 10 minutes. The predictive control system 148 may also know, based on weather forecast information associated with the desired destination 124, that upon arrival, the ambient temperature at the destination 124 will be approximately 25 degrees Fahrenheit. Further, based on stored historical information indicative of previous vehicle activities and/or passenger tendencies, the predictive control system 148 may know with a high degree of certainty, that a passenger of the vehicle 102 will open a door of the vehicle 102 upon arrival at the destination 124. Based at least in part on such information, the predictive control system 148 may determine a control strategy causing and/or requiring that the cabin temperature system increase a temperature of the cabin prior to arrival at the destination 124 by a predetermined amount. Such an amount may be effective to substantially offset a predicted cabin temperature decrease caused by the passenger opening the door of the vehicle 102 upon arrival at the destination 124. In such examples, the control strategy may also cause one or more components of the cabin temperature system or other vehicle system to increase a temperature of one or more seat cushions or other cabin components in order to offset a corresponding predicted temperature decrease caused by the passenger opening the door. Alternatively, in examples in which the forecasted temperature at the destination 124 is relatively hot (e.g., approximately 90 degrees Fahrenheit), the predictive control system 148 may determine a control strategy causing and/or requiring that the cabin temperature system decrease a temperature of the cabin prior to arrival at the destination 124 by a predetermined amount. Such an amount may be effective to substantially offset a predicted cabin temperature increase caused by the passenger opening the door of the vehicle 102 upon arrival at the destination 124.

FIG. 6 is a flow diagram of an example process illustrated as a collection of blocks in a logical flow graph. The various blocks shown in FIG. 6 represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

In particular, FIG. 6 is a flow diagram of an example method 600 for operating a vehicle (e.g., a driverless vehicle). For the duration of this disclosure, aspects of the method 600 will be described with respect to a powertrain of the vehicle 102 described above. However, as noted above, and as will be explained below, aspects of the method 600 may be equally applicable to the cabin temperature system of the vehicle 102, the powertrain cooling system of the vehicle 102, battery charging/discharging for those vehicles 102 which are electric, maximum acceleration thresholds, and/or to any of the other vehicle system(s) 204 or drive module(s) 214 described herein.

At 602, the example method 600 may include receiving sensor information and/or additional information from a variety of sources associated and/or in communication with the vehicle 102. For example, at 602, the vehicle computing device 202 may receive global positioning coordinates, indicative of a current location of the vehicle 102, from one or more of the location sensors (e.g., GPS sensors) of the sensor system(s) 206. At 602, the vehicle computing device 202 may also receive image data, LIDAR sensor data, RADAR sensor data, road network data, and/or other information associated with the environment 100 from one or more additional sensors of the sensor system(s) 206. Further, such information may also be used in accordance with the localization system 220 described in detail above to determine the location of the vehicle 102. At 602, the vehicle computing device 202 may further receive address information from a user of the vehicle 102, and/or from another source, indicating a desired destination 124. Further, at 602 the vehicle computing device 202 may receive additional information indicative of at least one of past vehicle operation, past operation of one or more vehicle system(s) 204, past operation of one or more drive module(s) 214, and/or safety requirements corresponding to operating the powertrain, braking system, suspension system, emitter(s) 208, drive module(s) 214 and/or various other vehicle systems 204. Such additional information received at 602 may also include grade information, surface quality information, curvature information, weather information (e.g., a weather forecast), and/or other information indicative of a characteristic of one or more roads 106 of the road network defining a planned travel path 146 of the vehicle 102. Any of the information received by the vehicle computing device 202 at 602 may comprise information stored in the memory 218, the data store 240, and/or in another component in communication with the vehicle computing device 202. Additionally or alternatively, the information received by the vehicle computing device 202 at 602 may comprise information collected in substantially real time, at regular intervals, at irregular intervals, substantially continuously, or by other methods.

At 604, the vehicle computing device 202 may determine one or more planned travel paths 146 associated with the vehicle 102. For example, at 604 the vehicle computing device 202 may determine a first planned travel path 146 of the vehicle 102, a second planned travel path 146 of the vehicle 102 sequentially following the first planned travel path along a trajectory or direction of travel of the vehicle 102, and/or any number of additional sequential planned travel paths 146.

In some examples, at 604 the prediction system 228, the planning system 224, and/or other system associated with the vehicle computing device 202 may generate and/or otherwise determine at least a portion of the planned travel path 146 based on a current location of the vehicle 102, an address or other information indicating a location of the desired destination 124, road network data, and/or any of the other information received at 602. In such examples, at 604 the prediction system 228, the planning system 224, and/or other system associated with the vehicle computing device 202 may determine one or more drive envelopes 138, each having a respective variable envelope length 144 extending in the direction of travel of the vehicle 102. In such examples, each drive envelope 138 may include a respective planned travel path 146 extending approximately centrally therethrough. Taken together, the one or more sequential planned travel paths 604 and/or corresponding drive envelopes 138 determined at 604 may define a route that the vehicle 102 traverses to reach the particular destination 124. In any of the examples described herein, the drive envelopes 138 and/or the planned travel paths 146 determined at 604 may be calculated in accordance with a receding horizon technique such that the drive envelopes 138 and/or the planned travel paths 146 provide commands for a particular time window (e.g. less than approximately one minute, less than approximately 30 seconds, less than approximately 10 seconds, between approximately 6 seconds and approximately 10 seconds, etc.) and are recalculated at a certain frequency (e.g. 10 Hz, 30 Hz, etc.). In an example embodiment, at least one of the planned travel paths 146 determined at 604 may comprise a path along which the vehicle 102 may be controlled to travel for between approximately 6 seconds and approximately 10 seconds, and such a planned travel path 146 may extend from a current location of the vehicle 102 toward the destination 124. Although described above as being determined by the vehicle computing device 202, in any of the examples described herein, one or more of the drive envelopes 138, planned travel paths 146, routes, trajectories, and/or other items or instructions determined at 604 may be generated, calculated, and/or otherwise determined, in whole or in part, by the remote computing device 234 at 604.

At 606, the vehicle computing device 202 may estimate, based at least in part on a planned travel path 146 determined at 604, a demand associated with the vehicle 102 traversing the respective planned travel path 146. For example, at 606, the predictive control system 148 and/or other system associated with the vehicle computing device 202 may receive information indicative of the drive envelope 138 and/or the planned travel path 146. For example, at 606 the prediction system 228, the planning system 224, and/or other system associated with the vehicle computing device 202 may provide the one or more planned travel paths 146 determined at 604, the one or more drive envelopes 138 determined at 604, and/or information indicative of such planned travel paths 146 and/or drive envelopes 138 to the predictive control system 148. Such information may include, for example, at least one of a starting position and/or orientation defining a start point of the planned travel path 146, an end position and/or orientation of the planned travel path 146, a travel speed, an acceleration, a grade of the road 106 defining the planned travel path 146, a curvature of the road 106, and/or any other information. At least some of the information indicative of the planned travel path 146 received by the predictive control system 148 may comprise the sensor information and/or additional information received by the vehicle computing device 202 at 602. At 606, the vehicle computing device 202 may estimate any of the demands described herein, and each respective demand may be estimated based at least in part on a corresponding one or more of the planned travel paths 146 determined at 604. Additionally, each respective demand estimated at 606 may be associated with the vehicle 102 traversing a corresponding planned travel path 146. Further, each respective demand may comprise an expected load and/or other demand of a particular one of the vehicle system(s) 204 or drive module(s) 214 that the predictive control system 148 predicts will be required for the vehicle 102 to traverse a corresponding planned travel path 146. For example, at 606 the predictive control system 148 associated with the vehicle computing device 202 may estimate a first demand of a first vehicle system 204 and/or of a first drive module 214 of the vehicle 102, and such a first demand may be associated with the vehicle 102 traversing a first one of the planned travel paths 146 determined at 604. For instance, such an example first demand may comprise a load and/or other demand that the predictive control system 148 predicts will be required of the first vehicle system 204 and/or of the first drive module 214 as the vehicle 102 traverses the corresponding first one of the planned travel paths 146. At 606 the predictive control system 148 may also estimate at least a second demand of the first vehicle system 204 and/or first drive module 214. Such a second demand may be associated with the vehicle 102 traversing a second one of the planned travel paths 146 determined at 604, the second planned travel path 146 sequentially following the first planned travel path noted above. For instance, such an example second demand may comprise a load and/or other demand that the predictive control system 148 predicts will be required of the first vehicle system 204 and/or of the first drive module 214 as the vehicle 102 traverses the second (e.g., downstream) travel path 146.

As noted above, the one or more demands estimated by the predictive control system 148 at 606 may comprise predicted or expected demands of particular vehicle system(s) 204 and/or drive module(s) 214. Such vehicle system(s) 204 may include a powertrain, a suspension system, a cabin temperature system, a powertrain cooling system, a braking system, and/or any of the other vehicle system(s) 204 noted herein. Also, such drive module(s) 214 may include a safety system, a high voltage battery, an inverter, a steering system, a stability control system, a lighting system, an onboard charging system, and/or other electrical components such as a DC/DC converter, a high voltage junction, a high voltage cable, charging system, charge port, etc. Further, one or more of the demands estimated at 606 may comprise a power required for a corresponding system (e.g., a powertrain) to propel the vehicle 102, at a desired acceleration, at a desired speed, and/or with a desired torque, as the vehicle 102 traverses a corresponding one of the planned travel paths 146 determined at 604. In additional examples in which the demand estimated at 606 comprises a demand of the suspension system of the vehicle 102, such a demand may comprise a ride height of the vehicle 102, a pitch, a roll, a yaw, a suspension stiffness, and/or other set point or configuration of the suspension system. In further examples in which the demand estimated at 606 comprises a demand of the cabin temperature system of the vehicle 102, such a demand may comprise a cabin temperature, a cabin humidity, and/or other set point or configuration (e.g., heating, cooling, air circulation fan, etc.) of the cabin temperature system. In additional examples in which the demand estimated at 606 comprises a demand of the powertrain cooling system of the vehicle 102, such a demand may comprise a motor temperature, a battery temperature, a radiator temperature, and/or any other fluid temperature, set point, or configuration of the powertrain cooling system. In further examples in which the demand estimated at 606 comprises a demand of the braking system of the vehicle 102, such a demand may comprise a desired braking distance or sensitivity, a brake fluid pressure, a hydraulic pressure setting, and/or any other set point (e.g., pneumatic, electric, magnetic, etc.) or configuration of the braking system.

As noted above, in some examples the predictive control system 148 may, at 606, estimate first and second demands of a first system of the vehicle 102. In such examples, the first demand may be associated with the vehicle 102 traversing a first one of the planned travel paths 146 determined at 604, and the second demand may be associated with the vehicle 102 traversing a second one of the planned travel paths 146 determined at 604 sequentially following the first planned travel path 146 in a direction of travel of the vehicle 102. In examples in which the first system of the vehicle 102 comprises a powertrain, the first demand estimated at 606 may comprise a first power required for the powertrain and/or components of the vehicle 102 associated with the poweretrain to propel the vehicle 102, at a first desired speed, at a first desired acceleration, and/or with a first desired torque, as the vehicle 102 traverses the first planned travel path 146. Similarly, in such examples the second demand estimated at 606 may comprise a second power required for the powertrain and/or components of the vehicle 102 associated with the poweretrain to propel the vehicle 102, at a second desired speed, at a second desired acceleration, and/or with a second desired torque, as the vehicle 102 traverses the second planned travel path 146 sequentially following the first planned travel path 146. In such examples, it is understood that the first power may be greater than, less than, or equal to the second power. Additionally, in such examples the first desired speed may be greater than, less than, or equal to the second desired speed, the first desired acceleration may be greater than, less than, or equal to the second desired acceleration, and the first desired torque may be greater than, less than, or equal to the second desired torque.

At 606, the predictive control system 148 may estimate any of the demands described herein based at least in part on simulations using expected kinematic requirements, estimates that are calculated and/or otherwise determined based on specifications received from component manufacturers, empirical data associated with the vehicle system(s) 204 and/or the drive module(s) 214, and/or other information. For example, as noted above with respect to at least FIGS. 3-5, the predictive control system 148 may estimate a power or other load that will be required of the power train of the vehicle 102 in order for the vehicle 102 to traverse the determined planned travel path 146 at a desired speed, within a desired speed range, at a desired acceleration, within a desired acceleration range, with a desired torque, within a desired range of torques, and/or within a desired period of time. Such a power, speed, acceleration, torque, and/or other demands associated with the respective vehicle systems may be estimated by the predictive control system 148 using one or more look-up tables, plots, graphs, charts, or other components, and information included in such components may be empirically determined through vehicle testing in a variety of operating conditions. Additionally or alternatively, such a power, speed, acceleration, torque, and/or other demands associated with the respective vehicle systems may be estimated by the predictive control system 148 by entering velocity information, acceleration information, road grade information, lateral motion information, and/or other information associated with and/or indicative of the planned travel path 146 as inputs into one or more torque algorithms, power algorithms, and/or other demand estimation algorithms. In still further examples, the predictive control system 148 may leverage one or more artificial intelligence, machine learning, and/or other decision-making components associated with the vehicle computing device in order to estimate such a demand.

FIGS. 3-5 illustrate example data that could be used by the predictive control system 148 to estimate a demand of a system of the vehicle 102 at 606. While FIGS. 3-5 illustrate information associated with the powertrain of the vehicle 102, in further examples, similar empirical data, simulation data, and/or other information may be used to estimate demands associated with the suspension system, the cabin temperature system, the powertrain cooling system, the power distribution system (including regenerative braking, battery charge/discharge, etc.), the braking system, the safety system, and/or other vehicle system(s) 204 or drive module(s) 214. For example such empirical data, simulation data, and/or other infirmation may include, among other things, thermal energy storage data, fluid viscosity data, heat flow data, cooling efficiency data, heating efficiency data, etc. In such examples, any of the sensor information and/or additional information received at 602 may also be used by the predictive control system 148 to estimate a demand of a system of the vehicle 102 at 606. Any such information may be used in combination with one or more look-up tables, plots, graphs, charts, demand estimation algorithms or other components in order to estimate such a demand. In such examples, the predictive control system 148 may leverage one or more artificial intelligence, machine learning, and/or other decision-making components associated with the vehicle computing device in order to estimate such a demand. Such demand predictions may refer to either an instantaneous demand at any point along the planned path and/or the total demand over the entire planned path.

At 608, the vehicle computing device 202 may determine, based at least in part on a demand determined at 606, a control strategy corresponding to one or more of the vehicle system(s) 204, subsytems, and/or one or more of the drive module(s) 214. For example, at 608, the predictive control system 148 and/or other system associated with the vehicle computing device 202 may determine a first control strategy corresponding to and/or otherwise governing the future operation of a first one of the vehicle system(s) 204, and may also determine a second control strategy corresponding to and/or otherwise governing the future operation of a second one of the vehicle system(s) 204. In such examples, the first control strategy may be determined based at least in part on at least one of the first demand or the second demand. For example, at 608 predictive control system 148 may determine the first control strategy based at least in part on the first demand (corresponding to the first vehicle system) associated with the vehicle 102 traversing the first planned travel path 146 as well as the second demand (corresponding to the first vehicle system) associated with the vehicle 102 traversing the second planned travel path 146 sequentially following the first planned travel path. In any of the examples described herein, one or more control strategies determined by the vehicle computing device 202 and/or the predictive system controller 148 may comprise a set of commands, programs, applications, or other operating instructions executable by the system controller(s) 226, vehicle system(s) 204, drive module(s) 214, and/or other components of the vehicle 102.

For instance, in examples in which the first system described above comprises the powertrain of the vehicle 102, the first demand associated with the first planned travel path 146 may be associated with a portion of the road 106 that requires the vehicle 102 to operate at a relatively constant speed, while the second planned travel path 146 sequentially following the first planned travel path may be associated with an additional portion of the road 106 that requires the vehicle 102 to accelerate relatively rapidly. In such examples, information indicative of the relatively constant speed requirement associated with the first planned travel path 146 (e.g., associated with the portion of the road 106) may cause the predictive system controller 148 to estimate, at 606, a relatively low first powertrain demand associated with the vehicle 102 traversing the second planned travel path 146. Similarly, information indicative of the relatively rapid acceleration requirement associated with the second planned travel path 146 (e.g., associated with the additional portion of the road 106) may cause the predictive system controller 148 to estimate, at 606, a relatively high second powertrain demand associated with the vehicle 102 traversing the second planned travel path 146. At 608, the predictive control system 148 may determine a powertrain control strategy associated with the vehicle 102 traversing the first planned travel path 146 that takes both the first and second demands into account. In some examples, (e.g., in examples in which the vehicle 102 is already operating in an all-wheel drive mode), such a control strategy may require maintaining operation of the vehicle 102 in the all-wheel drive mode of operation as the vehicle 102 traverses the first planned travel path and the second planned travel path.

Because the predictive control system 148 determines one or more control strategies at 608 based at least in part on information associated with a future demand of the vehicle 102 (e.g., the second demand associated with the second planned travel path), such control strategies may minimize unnecessary engagement and disengagement of various clutches, motors, and/or other components of the drivetrain over the entire trajectory or route between the location 120 and the destination 124. As a result, the various control strategies determined at 608 may result in significant power savings and corresponding increases in vehicle efficiency relative to known reactive control systems/strategies. In such examples, the control strategy determined at 608 may be contrary to control strategies employed by known "reactive" control systems in which vehicles would typically be operated in a front-wheel drive operating mode when minimal or a relatively low level of acceleration is required (e.g., as the vehicle traverses a road 106 that requires the vehicle 102 to operate at a relatively constant speed).

Although the control strategies described above with respect to 608 comprise powertrain control strategies, in further examples, the control strategies determined by the predictive control system 148 at 608 may also comprise control strategies corresponding to any of the other vehicle system(s) 204 and/or drive module(s) 214 of the vehicle 102. For instance, in examples in which the vehicle system 204 corresponding to one or more of the demands determined at 606 comprises a cabin temperature system of the vehicle 102, the predictive control system 148 may, at 608, determine a control strategy that requires operating at least one of a battery, a motor, a radiator, a thermal energy storage device, and/or other component of the vehicle 102 at a set point that is greater than a normal or optimal set point of the component. In such examples, the control strategy may require operating such a component at the elevated set point, for a first period of time (e.g., 10 minutes, 20 minutes, 30 minutes, etc.), and before the vehicle 102 traverses the first planned travel path 146 and/or the second planned travel path 146 described above. In such examples, the first planned travel path 146 and/or the second planned travel path 146 may comprise a path that the vehicle 102 is expected to (e.g., planned to, scheduled to, required to, etc.) traverse after the vehicle 102 has been in a dormant operation mode for a second period of time. Such a dormant operating may comprise, for example, a mode in which the vehicle 102 is charging, is turned "off," and/or is otherwise not in use for the second period of time. Such a second period of time may be, for example, any period of time greater than approximately 1 second (e.g., 10 seconds, 1 minute, 30 minutes, 1 hour, 2 hours, 4 hours, 6, hours, 8 hours, etc.).

For instance, such an example control strategy may be useful in situations in which the vehicle 102 is used at approximately 12:00 μm and is turned off and/or charged at approximately 1:00 pm (e.g., to drive to and from lunch). In such an example, the vehicle 102 may not be used again (e.g., may remain in a dormant operating mode) until approximately 5:00 pm on the same day (e.g., in order to drive home from work). In such examples, the vehicle 102 may be in a dormant operating mode for approximately 4 hours (e.g., from approximately 1:00 μm to approximately 5:00 pm). In such examples, a weather forecast associated with a future planned travel path corresponding to the drive home may indicate that temperatures are expected to be relatively cold (e.g., between approximately 30 degrees Fahrenheit and approximately 35 degrees Fahrenheit) between 5:00 pm and 6:00 pm on the same day. In such examples, the control strategy may require operating at least one of the battery or the motor of the vehicle 102 at an elevated set point for a first period of time equal to approximately 60 minutes (e.g., between approximately 12:00 pm and approximately 1:00 pm on that same day). Operating the at least one of the battery or the motor of the vehicle 102 at such an elevated set point, for such a first period of time, may raise the temperature of such components, and this excess thermal energy may be stored in such components until approximately 5:00 pm on the same day, at which time the cabin temperature system may utilize such stored thermal energy to assist in increasing the cabin temperature. Such a control strategy may require less net power and/or energy than, for example, attempting to increase the cabin temperature at 5:00 pm on that same day without such stored thermal energy. As a result, such a control strategy may assist in increasing the overall efficiency of the vehicle 102. In yet another example, the vehicle 102 may be traversing between a shaded region (e.g. under tree cover or between alley ways) to a generally unshaded area. In such an example, each region may impact the ability of an HVAC system of the vehicle 102 to maintain the interior cabin temperature of the vehicle 102 at a constant temperature. By having advance knowledge of the planned path, the vehicle 102 can, in anticipation of the travel path, preemptively adjust the internal cabin temperature to maintain a constant internal temperature.

In still other examples, in which the vehicle system 204 corresponding to one or more of the demands determined at 606 comprises a powertrain cooling system of the vehicle 102, the predictive control system 148 may, at 608, determine a control strategy that requires changing an orientation, position, and/or other configuration of a component of the vehicle 102 exposed to ambient air. In such examples, changing the orientation, position, and/or other configuration of such a component may increase convective cooling of a powertrain system cooling component before the vehicle 102 traverses the first planned travel path 146 and/or the second planned travel path 146 described above. Additionally or alternatively, changing the orientation, position, and/or other configuration of such a component may increase an aerodynamic drag of the vehicle 102 while the vehicle 102 is in motion, and before the vehicle 102 traverses the first planned travel path 146 and/or the second planned travel path 146.

Such an example control strategy may be useful in situations in which the vehicle 102 includes one or more moveable shutters, vanes, louvers, fins, panels, windows, and/or other structures configured to move and/or otherwise transition between a substantially open position and a substantially closed positon. In such examples, the vehicle 102 may include a hydraulic actuator, an electric actuator (e.g., a stepper motor, a servo, etc.), a pneumatic actuator, and/or any other controllable actuator operably connected to one or more of the above structures to assist in transitioning such structures between the substantially open position and the substantially closed positon. In some examples, positioning the one or more moveable shutters, louvers, fins, vanes, panels, windows, and/or other structures in a substantially open position may permit ambient air to contact and/or convectively cool a radiator, battery, electric motor, and/or other component of the powertrain cooling system or of the powertrain before the vehicle 102 traverses the first planned travel path 146 and/or the second planned travel path 146 described above. Additionally, positioning the one or more moveable shutters, louvers, fins, vanes, panels, windows, and/or other structures in a substantially open position may increase the aerodynamic drag of the vehicle 102 while the vehicle 102 is in motion. Accordingly, control strategies requiring positioning such components in the substantially open positon may reduce overall vehicle efficiency, and may be best suited for relatively low vehicle speeds in which the efficiency reduction associated with such increased aerodynamic drag may be minimized.

Positioning the one or more moveable shutters, louvers, fins, panels, windows, and/or other structures in a substantially closed position may restrict and/or substantially prohibit ambient air from contacting and/or convectively cooling a radiator, battery, electric motor, and/or other component of the powertrain cooling system or of the powertrain. As a result, although positioning such components in the substantially closed position may reduce and/or minimize the aerodynamic drag of the vehicle 102 while the vehicle 102 is in motion, positioning such components in the substantially closed position will reduce the ability of the vehicle 102 to utilize ambient air for cooling components of the powertrain cooling system or of the powertrain. Control strategies requiring positioning such components in the substantially closed positon may be best suited for relatively high vehicle speeds (e.g., on-highway driving) in which vehicle efficiency may be maximized by minimizing aerodynamic drag.

At 610, the vehicle computing device 202 may determine, based at least in part on the sensor information and/or additional information received at 602, whether modifications to the one or more control strategies determined at 608 are required. For example, at 610, the predictive control system 148 and/or other system associated with the vehicle computing device 202 may compare a current location and/or orientation of the vehicle 102, image data, LIDAR sensor data, RADAR sensor data, road network data, and/or other information associated with the environment 100 with one or more corresponding predetermined thresholds or threshold values/ranges. Additionally or alternatively, at 610 the predictive control system 148 may compare information indicative of at least one of past vehicle operation, past operation of one or more vehicle system(s) 204, past operation of one or more drive module(s) 214, and/or safety requirements corresponding to operating the emitter(s) 208, drive module(s) 214, and/or vehicle system(s) 204 to one or more corresponding predetermined thresholds or threshold values/ranges. Further, at 610 the predictive control system 148 may compare information indicative of at least one of road grade, road surface quality, road curvature, past, current or future weather (e.g., a weather forecast), and/or other information to one or more corresponding predetermined thresholds or threshold values/ranges.

In examples in which the information compared at 610 does not meet or exceed a corresponding predetermined threshold value, is within a corresponding predetermined threshold range (e.g., 610—No), or is otherwise indicative that a control should be initiated, the predictive control system 148 may not modify the one or more control strategies determined at 608. In such examples, at 612 the vehicle computing device 202 may cause operation of at least one of the vehicle systems 204 described herein based at least in part on a corresponding control strategy determined at 608 as the vehicle 102 traverses the one or more planned travel paths 146 determined at 604. For example, at 612 the predictive control system 148 and/or the one or more system controller(s) 226 may cause operation of at least one of the vehicle systems 204 described herein based at least in part on a corresponding control strategy determined at 608 at least one of before the vehicle 102 traverses the one or more planned travel paths 146 determined at 604, or as the vehicle 102 traverses the one or more planned travel paths 146 determined at 604.

In examples in which the information compared at 610 meets or exceeds a corresponding predetermined threshold value, is outside of a corresponding predetermined threshold range (e.g., 610—Yes), or is otherwise indicative that a control should be initiated, the predictive control system 148 may determine one or more modified control strategies at 614. In such examples, at 614 the predictive control system 148 may determine such a modified control strategy based at least in part on any of the processes described above with respect to 608. Additionally or alternatively, the predictive system controller 148 may determine such a modified control strategy at 614 using sensor information and/or additional information received at 602 as inputs into a fuzzy logic controller, one or more control strategy determination algorithms, look-up tables, neural networks, artificial intelligence components, machine learning components, and/or other control strategy determination/modification components associated with the vehicle computing device 202 in order to determine such a modified control strategy. In particular, at 614 the predictive control system 148 may enter at least a portion of the information determined at 610 to be greater than a corresponding predetermined threshold value, or outside of a corresponding predetermined threshold range, as inputs into one or more such components. Thus, the modified control strategy may be determined at 614 based at least in part on such information, and the modified control strategy determined at 614 may comprise an output of one or more such components.

At 616, the vehicle computing device 202 may cause operation of at least one of the vehicle systems 204 described herein based at least in part on a corresponding modified control strategy determined at 614 as the vehicle 102 traverses the one or more planned travel paths 146 determined at 604. For example, at 616 the predictive control system 148 and/or the one or more system controller(s) 226 may cause operation of at least one of the vehicle systems 204 described herein based at least in part on a corresponding modified control strategy determined at 614 at least one of before the vehicle 102 traverses the one or more planned travel paths 146 determined at 604, or as the vehicle 102 traverses the one or more planned travel paths 146 determined at 604.

In any of the examples described herein, the predictive control system 148 may estimate a power, load, and/or other such demand that will be required for the vehicle 102 to traverse a planned travel path 146. Such estimated demands may comprise predicted and/or otherwise estimated requirements of one or more of the vehicle system(s) 204 and/or drive module(s) 214 associated with the vehicle 102 traversing the planned travel path 146. In particular, such estimated demands may include demands associated with a first planned travel path as well as a second planned travel path sequentially following the first planned travel path along a travel route or trajectory of the vehicle 102. The predictive control system 148 may also be configured to generate and/or otherwise determine a control strategy corresponding to one or more of the vehicle system(s) 204 and/or drive module(s) 214 based at least in part on such estimated demands. Because the predictive control system 148 determines one or more control strategies based at least in part on information associated with such future demands of the vehicle 102 (e.g., a second demand associated with the second planned travel path described above), such control strategies may minimize unnecessary engagement, disengagement, activation, movement, and/or other operations of vehicle components over the entire trajectory or travel route traversed by the vehicle 102. As a result, controlling operation of one or more of the vehicle system(s) 204 and/or drive module(s) 214 in accordance with the various control strategies described herein may reduce the vehicle resources used in traversing one or more planned travel paths 146, and may result in significant power savings and corresponding increases in vehicle efficiency relative to known "reactive" control systems/strategies.

EXAMPLE CLAUSES

The clauses listed below are representative of example embodiments of the present disclosure. Any of the clauses listed below, and/or individual features thereof, may be combine in any manner and/or in any order.

Clause A: A method includes determining, at a computing device of a vehicle, a planned travel path of the vehicle; determining, at the computing device, a series of demands of a system of the vehicle, the series of demands being associated with the vehicle traversing the planned travel path; determining, at the computing device and based at least in part on a difference between a demand of the series of demands and a current demand of the system, a control strategy corresponding to the system of the vehicle; and causing, by the computing device, operation of the system, based at least in part on the control strategy, as the vehicle traverses the planned travel path.

Clause B: The method of clause A, wherein: the system comprises one of a powertrain, a suspension system, a cabin temperature system, a powertrain cooling system, or a braking system, and the demand comprises one of: a power required for the system to propel the vehicle, at an acceleration, as the vehicle traverses the planned travel path, a ride height, a cabin temperature, a motor temperature, a battery temperature, or a braking distance.

Clause C: The method of clause A or B, wherein: the planned travel path comprises a path along which the vehicle is expected to travel for between approximately 6 seconds and approximately 10 seconds, and the planned travel path extends from a current location of the vehicle toward a destination location.

Clause D: The method of clause A, B, or C, wherein: the current demand comprises a first power required for the system to propel the vehicle, the vehicle operating at a first optimal efficiency in an all-wheel drive mode when delivering the first power; an intermittent demand comprises a second power required for the system to further propel the vehicle, the vehicle operating at a second optimal efficiency in a front-wheel drive mode when delivering the second power, and the intermittent demand being associated with a portion of the planned travel path after a first portion corresponding to the current demand and before a second portion corresponding to a future demand of the series of demands; the future demand comprises a third power required for the vehicle system to propel the vehicle, the vehicle operating at a third optimal efficiency in the all-wheel drive mode when delivering the third power; and the control strategy requires maintaining operation of the vehicle in the all-wheel drive mode as the vehicle traverses the planned travel path.

Clause E: The method of clause A, B, C, or D, further comprising: receiving information indicative of at least one of past vehicle operation, or a characteristic of a road defining at least one of a first planned travel path or a second planned travel path; comparing the information to a predetermined threshold; and determining a modified control strategy based at least in part on the comparing, wherein causing, at the computing device, operation of the system, based at least in part on the control strategy comprises causing operation of the system based at least in part on the modified control strategy.

Clause F: A method includes estimating, at a computing device and based at least in part on a planned travel path of a vehicle, a future demand associated with the vehicle traversing the planned travel path; determining, at a computing device, a current demand associated with the vehicle; determining, at the computing device and based at least in part on the current demand and the future demand, a control strategy corresponding to a system of the vehicle; and causing operation of the system, by the computing device and based at least in part on the control strategy.

Clause G: The method of clause F, further comprising receiving, at a predictive control system associated with the computing device, information indicative of the planned travel path, the information comprising at least one of a speed, an acceleration, or a grade of a road defining at least a portion of the planned travel path.

Clause H: The method of clause F or G, wherein the vehicle comprises an autonomous vehicle, the computing device comprises a computing device disposed on the vehicle, and the method further comprises determining the planned travel path at the computing device.

Clause I: The method of clause F, G, or H, wherein: the future demand is one of a series of demands associated with the system as the vehicle traverses the planned travel path, the current demand comprises a first power required for the system to propel the vehicle, the future demand comprises a second power required for the system to propel the vehicle as the vehicle traverses the planned travel path, the second power required is different than the first power required, the system comprises a powertrain of the vehicle, and the control strategy requires maintaining operation of the vehicle in an all-wheel drive mode as the vehicle traverses the planned travel path.

Clause J: The method of clause F, G, H, or I, wherein: the system comprises a cabin temperature system, the future demand comprises an output of the cabin temperature system to obtain a cabin temperature, and the control strategy requires operating the cabin temperature system at a set point other than an optimal set point associated with a current demand, for a first period of time, before the vehicle traverses the planned travel path.

Clause K: The method of clause F, G, H, I, or J, further comprising: determining a weather forecast associated with the planned travel path, wherein the set point is determined based at least in part on the weather forecast.

Clause L: The method of clause F, G, H, I, J, or K, wherein: the future demand comprises a motor temperature or a battery temperature, the system comprises a powertrain cooling system, the control strategy requires changing the motor temperature or the battery temperature using the powertrain cooling system prior to the vehicle traversing the portion of the planned travel path associated with the future demand.

Clause M: The method of clause F, G, H, I, J, K, or L, wherein: changing the motor temperature or the battery temperature comprises changing a position of a component of the vehicle exposed to ambient air, changing the position of the component increases convective cooling of the powertrain cooling system, and the component of the vehicle comprises at least one of a moveable shutter, louver, fin, vane, panel, or window connected to an actuator of the vehicle.

Clause N: A vehicle includes a plurality of vehicle systems; a plurality of drive modules; and a computing device operably connected to the plurality of vehicle systems and the plurality of drive modules, the computing device being configured to: determine a current demand associated with a vehicle system of the plurality of vehicle systems; determine a future demand associated with the vehicle traversing a planned travel path, determine, based at least in part on the current demand and the future demand, a control strategy corresponding to the vehicle system of the plurality of vehicle systems, and cause operation of the of the vehicle system, based at least in art on the control strategy.

Clause O: The vehicle of clause N, wherein: the current demand comprises a first power required for the vehicle system to propel the vehicle, the vehicle operating at a first optimal efficiency in an all-wheel drive mode when delivering the first power; an intermittent demand comprises a second power required for the vehicle system to further propel the vehicle, the vehicle operating at a second optimal efficiency in a front-wheel drive mode when delivering the second power, the intermittent demand being associated with a portion of the planned travel path after a first portion corresponding to the current demand and before a second portion corresponding to the future demand; the future demand comprises a third power required for the vehicle system to propel the vehicle, the vehicle operating at a third optimal efficiency in the all-wheel drive mode when delivering the third power; and the control strategy requires maintaining operation of the vehicle in an all-wheel drive mode as the vehicle traverses the planned travel path.

Clause P: The vehicle of clause N or O, wherein: the vehicle comprises an autonomous vehicle, the future demand is one of a series of demands associated with the vehicle system while traversing the planned travel path, and determining the future demand comprises: receiving sensor data from a sensor on the autonomous vehicle; determining, based at least in part on the sensor data, a position of the autonomous vehicle; generating, based at least in part on the position and an intended destination, a plurality of trajectories in accordance with a receding horizon; selecting a trajectory of the plurality trajectories as the planned travel path, the trajectory associated with a plurality of velocities, a plurality of accelerations, a plurality of road inclinations, or a plurality of external temperatures; determining the series of demands of the vehicle system to cause the vehicle to move along the trajectory; and selecting the future demand from the series of demands.

Clause Q: The vehicle of clause N, O, or P, wherein the future demand comprises an output of a cabin temperature system to obtain a cabin temperature, and the control strategy requires operating the cabin temperature system at a set point other than an optimal set point.

Clause R: The vehicle of clause N, O, P, or Q, wherein the computing system is further configured to determine a weather forecast associated with the planned travel path; and the set point is determined, based on the weather forecast, such that the cabin temperature remains substantially constant throughout the planned travel path.

Clause S: The vehicle of clause N, O, P, Q, or R, wherein the future demand comprises a vehicle temperature, the vehicle temperature associated with a motor or a battery of the vehicle, the system comprises a powertrain cooling system, and the control strategy requires changing an output of the powertrain cooling system to achieve the vehicle temperature.

Clause T: The vehicle of clause N, O, P, Q, R, or S, wherein: changing the output of the powertrain cooling system comprises changing the position of a component of the vehicle to increase convective cooling of the powertrain cooling system before the vehicle traverses the planned travel path, and the component of the vehicle comprises at least one of a moveable shutter, louver, fin, vane, panel, or window connected to an actuator of the vehicle.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A method, comprising:
   determining, at a computing device of a vehicle, a planned travel path of the vehicle;
   determining, at the computing device, a series of demands of a system of the vehicle, the series of demands being associated with the vehicle traversing subsequent portions of the planned travel path and a first demand of the series of demands differing from a second demand in the series of demands;

determining, at the computing device and based at least in part on a difference between the second demand and a current demand of the system, a control strategy corresponding to the system of the vehicle; and causing, by the computing device, operation of the system, based at least in part on the control strategy, as the vehicle traverses the planned travel path, wherein:

the current demand comprises a first power required for the system to propel the vehicle, the vehicle operating at a first optimal efficiency in an all-wheel drive mode when delivering the first power;

the intermittent demand of the series of demands between the current demand and the second demand comprises a second power required for the system to further propel the vehicle, the vehicle operating at a second optimal efficiency in a front-wheel drive mode when delivering the second power, and the intermittent demand being associated with a portion of the planned travel path after a first portion corresponding to the current demand and before a second portion corresponding to the second demand of the series of demands;

the second demand comprises a third power required for the system to propel the vehicle, the vehicle operating at a third optimal efficiency in the all-wheel drive mode when delivering the third power; and the control strategy requires maintaining operation of the vehicle in the all-wheel drive mode as the vehicle traverses the planned travel path.

2. The method of claim 1, wherein:

the planned travel path comprises a path along which the vehicle is expected to travel for between approximately 6 seconds and approximately 10 seconds, and the planned travel path extends from a current location of the vehicle toward a destination location.

3. The method of claim 1, further comprising:

receiving information indicative of at least one of past vehicle operation, or a characteristic of a road defining at least one of a first planned travel path or a second planned travel path;

comparing the information to a predetermined threshold; and determining a modified control strategy based at least in part on the comparing, wherein causing, at the computing device, operation of the system, based at least in part on the control strategy comprises causing operation of the system based at least in part on the modified control strategy.

4. The method of claim 1, wherein determining the series of demands of the system of the vehicle is based at least in part on map data associated with the planned travel path.

5. The method of claim 1, wherein determining the control strategy corresponding to the system of the vehicle is based at least in part on minimizing energy consumption by the system while traveling the planned travel path.

6. A method, comprising:

estimating, at a computing device and based at least in part on a planned travel path of a vehicle, a future demand associated with the vehicle traversing the planned travel path, wherein the future demand is one of a series of demands as the vehicle traverses subsequent portions of the planned travel path;

determining, at the computing device, a current demand associated with the vehicle, wherein the future demand includes a future value of a parameter and the current demand includes a current value of the parameter;

determining, at the computing device and based at least in part on the current value of the parameter of the current demand and the future value of the parameter of the future demand, a control strategy corresponding to a system of the vehicle; and causing operation of the system, by the computing device and based at least in part on the control strategy, wherein the current demand comprises a first power required for the system to propel the vehicle, the vehicle operating at a first optimal efficiency in an all-wheel drive mode when delivering the first power;

an intermittent demand of the series of demands between the current demand and the future demand comprises a second power required for the system to further propel the vehicle, the vehicle operating at a second optimal efficiency in a front-wheel drive mode when delivering the second power, and the intermittent demand being associated with a portion of the planned travel path after a first portion corresponding to the current demand and before a second portion corresponding to the future demand of the series of demands;

the future demand comprises a third power required for the system to propel the vehicle, the vehicle operating at a third optimal efficiency in the all-wheel drive mode when delivering the third power; and the control strategy requires maintaining operation of the vehicle in the all-wheel drive mode as the vehicle traverses the planned travel path.

7. The method of claim 6, further comprising receiving, at a predictive control system associated with the computing device, information indicative of the planned travel path, the information comprising at least one of a speed, an acceleration, or a grade of a road defining at least a portion of the planned travel path.

8. The method of claim 6, wherein the vehicle comprises an autonomous vehicle, the computing device comprises a computing device disposed on the vehicle, and the method further comprises determining the planned travel path at the computing device.

9. A vehicle, comprising:

a plurality of vehicle systems;

a plurality of drive modules; and a computing device operably connected to the plurality of vehicle systems and the plurality of drive modules, the computing device being configured to:

determine a current demand associated with a vehicle system of the plurality of vehicle systems;

determine a future demand associated with the vehicle traversing a planned travel path, wherein the future demand includes a future value of a parameter and the current demand includes a current value of the parameter;

determine, based at least in part on the current value of the parameter of the current demand and the future value of the parameter of the future demand, a control strategy corresponding to the vehicle system of the plurality of vehicle systems, and cause operation of the vehicle system, based at least in part on the control strategy, wherein the current demand comprises a first power required for the vehicle system to propel the vehicle, the vehicle operating at a first optimal efficiency in an all-wheel drive mode when delivering the first power;

an intermittent demand comprises a second power required for the vehicle system to further propel the vehicle, the vehicle operating at a second optimal efficiency in a front-wheel drive mode when delivering the second power, the intermittent demand being associated with a portion of the planned travel path after a first portion corresponding to the current demand and before a second portion corresponding to the future demand;

the future demand comprises a third power required for the vehicle system to propel the vehicle, the vehicle operating at a third optimal efficiency in the all-wheel drive mode when delivering the third power; and the control strategy requires maintaining operation of the vehicle in the all-wheel drive mode as the vehicle traverses the planned travel path.

10. The vehicle of claim 9, wherein:

the vehicle comprises an autonomous vehicle, the future demand and the intermittent demand are demands of a series of demands associated with the vehicle system while traversing the planned travel path, wherein individual demands of the series of demands are associated with respective portions of the planned travel path, and determining the future demand comprises:
 receiving sensor data from a sensor on the autonomous vehicle;
 determining, based at least in part on the sensor data, a position of the autonomous vehicle;
 generating, based at least in part on the position and an intended destination, a plurality of trajectories in accordance with a receding horizon;
 selecting a trajectory of the plurality of trajectories as the planned travel path, the trajectory associated with a plurality of velocities, a plurality of accelerations, a plurality of road inclinations, or a plurality of external temperatures;
 determining the series of demands of the vehicle system to cause the vehicle to move along the trajectory; and
 selecting the future demand from the series of demands.

* * * * *